United States Patent
Gutoski et al.

(10) Patent No.: US 9,780,948 B1
(45) Date of Patent: Oct. 3, 2017

(54) GENERATING INTEGERS FOR CRYPTOGRAPHIC PROTOCOLS

(71) Applicant: ISARA Corporation, Waterloo (CA)

(72) Inventors: Gustav Michael Gutoski, Waterloo (CA); Shane Daniel Kelly, Waterloo (CA); Marinus Struik, Toronto (CA); Atsushi Yamada, Toronto (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/182,820

(22) Filed: Jun. 15, 2016

(51) Int. Cl.
*H04L 9/06* (2006.01)
*G06F 7/58* (2006.01)
*H04L 9/26* (2006.01)

(52) U.S. Cl.
CPC ............ *H04L 9/0662* (2013.01); *G06F 7/586* (2013.01); *G06F 7/588* (2013.01); *H04L 9/26* (2013.01); *H04L 2209/08* (2013.01)

(58) Field of Classification Search
CPC ... H04L 9/22; H04L 9/26; H04L 9/065; H04L 9/0662; G06F 7/582; G06F 7/588
USPC .......................................... 380/46, 267, 268
See application file for complete search history.

(56) References Cited

U.S. PATENT DOCUMENTS

| | | | | | |
|---|---|---|---|---|---|
| 5,659,303 | A * | 8/1997 | Adair, Jr. | ............... | G08C 17/02 340/870.02 |
| 2003/0004684 | A1* | 1/2003 | Skingsley | ........... | H04L 12/2697 702/186 |
| 2003/0055572 | A1* | 3/2003 | Kuki | ........................ | G11B 5/09 702/26 |
| 2003/0125015 | A1* | 7/2003 | Inoue | ........................ | H04L 9/00 455/411 |
| 2003/0187598 | A1* | 10/2003 | Hars | ........................ | G06F 7/58 702/75 |
| 2003/0187889 | A1* | 10/2003 | Hars | ........................ | G06F 17/18 708/250 |
| 2004/0078414 | A1* | 4/2004 | Geiringer | .............. | H04L 9/3093 708/530 |
| 2004/0078570 | A1* | 4/2004 | Geiringer | .............. | H04L 9/3093 713/165 |

(Continued)

OTHER PUBLICATIONS

Gueron, S. et al., "Speeding up R-LWE post-quantum key exchange," Cryptology ePrint Archive: Report 2016/467, dated May 14, 2016, 13 pages.
Alkim, E. et al., "Post-quantum key exchange—a new hope," Cryptology ePrint Archive: Report 2015/1092, version dated Dec. 7, 2015, 34 pages.
Alkim, E. et al., "Post-quantum key exchange—a new hope," Cryptology ePrint Archive: Report 2015/1092, version dated Mar. 29, 2016, 21 pages.

(Continued)

*Primary Examiner* — Zachary A Davis
*Assistant Examiner* — Peiliang Pan
(74) *Attorney, Agent, or Firm* — Henry Patent Law Firm PLLC

(57) ABSTRACT

In a general aspect, pseudorandom integers are generated for use in a cryptographic protocol. In some aspects, a first plurality of digits are obtained and converted to a second plurality of digits. The first plurality of digits (e.g., bits) represent an integer in a first number system (e.g., binary), and the second plurality of digits (e.g., trits) represent the integer in a second number system (e.g., trinary). A plurality of integers in the first number system are generated based on the second plurality of digits, and an array of integers is produced. Each integer in the array is less than a modulus, and the array includes the plurality of integers. The array of integers can be used in a lattice-based cryptographic protocol.

30 Claims, 7 Drawing Sheets

(56) References Cited

U.S. PATENT DOCUMENTS

| | | | | |
|---|---|---|---|---|
| 2004/0078576 | A1* | 4/2004 | Geitinger | G06F 7/582 713/181 |
| 2006/0031507 | A1* | 2/2006 | Wang | G06Q 10/107 709/226 |
| 2007/0255941 | A1* | 11/2007 | Ellis | H04L 9/0662 713/151 |
| 2009/0279690 | A1* | 11/2009 | Michaels | G06F 7/58 380/28 |
| 2012/0213359 | A1* | 8/2012 | Troncoso Pastoriza | H04L 9/008 380/28 |
| 2012/0300925 | A1* | 11/2012 | Zaverucha | H04L 51/00 380/46 |
| 2013/0083701 | A1* | 4/2013 | Tomic | H04L 12/462 370/255 |
| 2013/0136255 | A1 | 5/2013 | Brown | |
| 2013/0298231 | A1* | 11/2013 | Jiang | H04L 63/08 726/22 |
| 2014/0233731 | A1* | 8/2014 | Naccache | H04L 9/008 380/44 |
| 2016/0099881 | A1* | 4/2016 | Swartzentruber | H04L 49/9084 370/235 |
| 2016/0099882 | A1* | 4/2016 | Swartzentruber | H04L 47/326 370/235 |
| 2016/0234009 | A1* | 8/2016 | Li | H04L 9/001 |

OTHER PUBLICATIONS

Galbraith, S., "Space-efficient variants of cryptosystems based on learning with errors," 2013, accessed Apr. 2016 at https://www.math.auckland.ac.nz/~sga1018/compact-LWE.pdf, 14 pages.

Information Technology Laboratory, National Institute of Standards and Technology, FIPS PUB 202, "SHA-3 Standard: Permutation-Based Hash Extendable-Output Functions," Aug. 2015, 37 pages.

Google Search Statistics—Internet Live Stats, accessed at http://www.internetlivestats.com/google-search-statistics/ on Apr. 19, 2016, 9 pages.

Peikert, C., A Decade of Lattice Cryptography, Feb. 2016, 90 pages.

Peikert, C., Lattice Cryptography for the Internet, Jul. 2014, 25 pages.

European Telecommunications Standards Institute (ETSI); Quantum Safe Cryptography and Security, ETSI White Paper No. 8, Jun. 2015, France, 64 pages.

Alkim, E., et al., "TESLA: Tightly-Secure Efficient Signatures from Standard Lattices," Cryptology ePrint Archive: Report 2015/755, dated Jul. 29, 2015, 25 pages.

Bai, S., et al., "An improved compression technique for signatures based on learning with errors," Cryptology ePrint Archive: Report 2013/838, dated Jan 22, 2014, 28 pages.

Akleylek, S., et al., "An Efficient Lattice-Based Signature Scheme with Provably Secure Instantiation," Cryptology ePrint Archive: Report 2016/030, dated Feb. 22, 2016, 21 pages.

* cited by examiner

GENERATING INTEGERS FOR CRYPTOGRAPHIC PROTOCOLS

BACKGROUND

The following description relates to generating integers for cryptographic protocols.

Cryptography systems are used to communicate securely over public channels. For example, some cryptography systems provide confidentiality by encrypting messages, and some cryptography systems provide authenticity through digital signatures. Many cryptography systems use pseudorandom values, for example, from a pseudorandom number generator.

DETAILED DESCRIPTION

Figure 1:
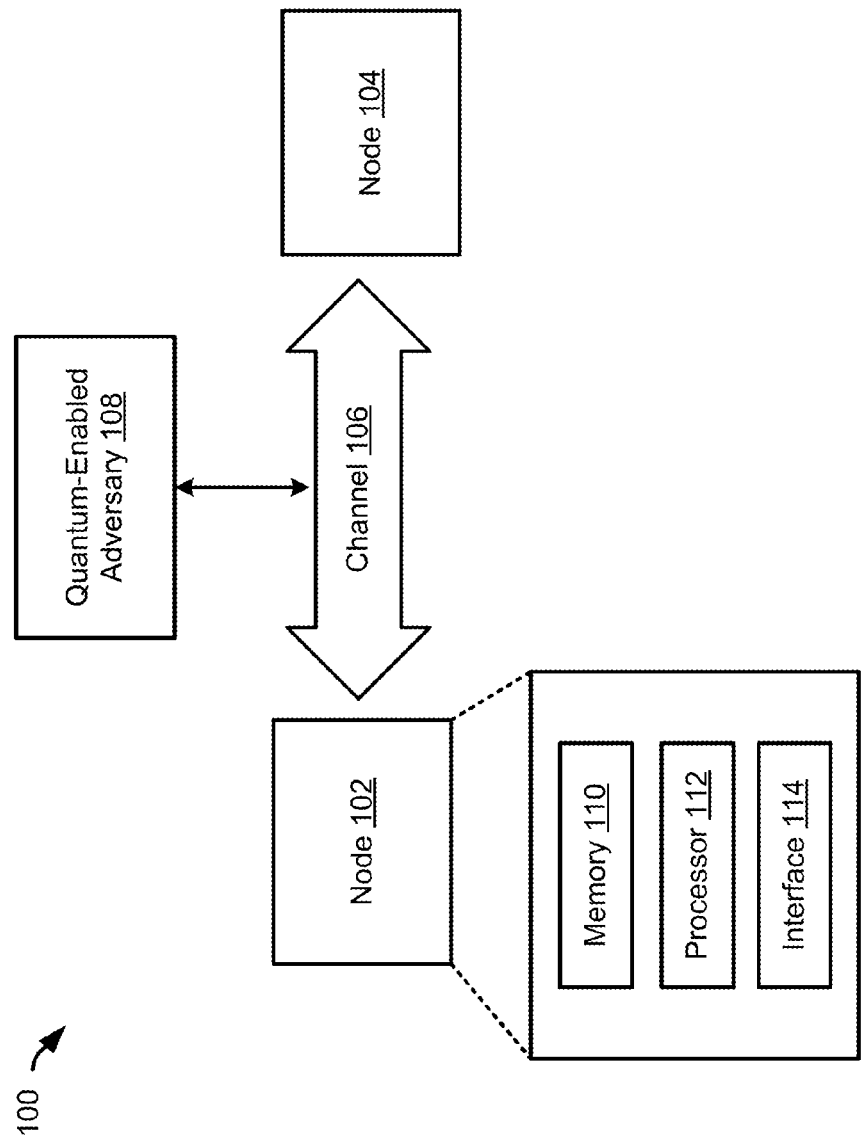
FIG. 1 is a block diagram showing aspects of an example communication system.

In some aspects of what is described here, integers are generated for use in a cryptographic protocol. In some instances, the integers can be generated in a manner that improves the utilization of computational resources, for example, by reducing the amount of pseudorandom data used. In some contexts, even small improvements in efficiency of a cryptographic protocol can save significant computational resources. For example, key agreement protocols are likely executed billions of times each day across the world to establish secure connections over computer networks such as the Internet.

In some implementations, integer parameters for a key agreement protocol are generated in a manner that reduces the amount of pseudorandom data used. An example key agreement protocol referred to as "New Hope" has been proposed as a quantum-resistant replacement for contemporary key agreement protocols (e.g., to replace Diffie-Hellman (DH) and elliptic curve Diffie-Hellman (ECDH) key agreement protocols). In a recent version of the "New Hope" proposal, the authors report that "the generation of a costs roughly 44% of the cycles on the server side" in one of their implementations of New Hope (see "Post-quantum key exchange—a new hope," by Erdem Alkim, Léo Ducas, Thomas Pöppelmann, and Peter Schwabe, December 2016). The public parameter a in the New Hope proposal can be viewed as a 1024-element array of integers in $\{0, \ldots, 12288\}$. The computational cost of generating the public parameter a in the New Hope proposal includes the computation of pseudorandom data, and a reduction in the amount of pseudorandom data consumed in the generation of the public parameter a could yield a significant savings in computation.

In some implementations of the techniques described here, the efficiency of generating public integers for the "New Hope" protocol, or for another type of cryptographic protocol, can be improved. For example, one step in the "New Hope" cryptographic key agreement protocol calls for the public parameter a to be communicated between parties via a short 32-byte seed, from which the full two-kilobyte description of a is generated. The New Hope proposal recommends using the extendable-output function known as SHAKE-128 to expand the 32-byte seed to the full public parameter a. In particular, the New Hope proposal generates each element of the public parameter a by the following process:

(1) Retrieve two bytes of pseudorandom data from the seeded SHAKE-128 function;
(2) Discard two bits of the retrieved pseudorandom data, and interpret the remaining 14 bits as an integer x in $\{0, \ldots, 2^{14}-1\}$;
(3) If x>12288, then reject the integer x and return to step 1; and
(4) Return x.

The probability of rejection in step 3 is approximately 25%. On average, then, this process can be expected to consume 2730 bytes of pseudorandom data to generate the public parameter a.

In some implementations, the techniques described below (e.g., the example process 400 shown in FIG. 4A, or variants thereof) can expand the 32-byte seed to the full public parameter a for the New Hope proposal using fewer bytes of pseudorandom data, for example, on average over multiple iterations. For instance, batch processing can be used to produce multiple nonzero elements of the public parameter a with lower per-element consumption of pseudorandom data than the process described in the New Hope proposal, which is summarized above. In some examples described below, the public parameter a can be generated by a process that can be expected to consume 1856 bytes of pseudorandom data. In some examples described below, the public parameter a can be generated by a process that can be expected to consume 1754 bytes of pseudorandom data. The techniques described below may provide additional or different technical advantages in some contexts.

More generally, the techniques described below can be used in some instances to improve, and in some cases optimize, the use of pseudorandom data in the generation of cryptographic parameters. For instance, the techniques described below can be applied to the New Hope protocol instantiated with different parameters, or to another type of cryptographic protocol that generates a random-looking array of integers from a short seed. In some cases, the techniques described below can be adapted for lattice-based cryptographic protocols or other types of cryptographic protocols or processes.

FIG. 1 is a block diagram showing aspects of an example communication system 100. The example communication system 100 shown in FIG. 1 includes a two nodes 102, 104 that use a cryptographic scheme to communicate with each other over a channel 106. In the example shown, a quantum-enabled adversary 108 has access to information exchanged on the channel 106. A communication system may include additional or different features, and the components in a communication system may be configured to operate as shown or in another manner.

In some implementations, the nodes 102, 104 have a server-client relationship. For example, the node 102 can be a server and the node 104 can be its client in a served network, or vice-versa. In some implementations, the nodes 102, 104 have a peer-to-peer relationship. For example, the nodes 102, 104 can be peers in a peer-to-peer network. The nodes 102, 104 may have another type of relationship in the communication system 100.

The example nodes 102, 104 each have computational resources (e.g., hardware, software, firmware) that are used to communicate with other nodes. In some implementations, the nodes 102, 104 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112 and an interface 114. Each of the nodes 102, 104 may include the same, additional or different components, and the nodes 102, 104 may be configured to operate as shown and described with respect to FIG. 1 or in another manner.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in any of FIGS. 2, 3, 4A, 4B, 5 and 6.

In the example node 102 shown in FIG. 1, the processor 112 can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in any of FIGS. 2, 3, 4A, 4B, 5 and 6.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes or devices. In some cases, the interface 114 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. In some examples, the channel 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptosystems that are believed to be invulnerable to quantum attack. For example, "New Hope" has been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner.

The example quantum-enabled adversary 108 shown in FIG. 1 can access information exchanged on the channel 106. For example, the quantum-enabled adversary 108 may access some or all of the information sent from the node 102 to the node 104 or to another recipient. In some instances, the quantum-enabled adversary 108 can directly observe correspondence between the nodes 102, 104; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptographic algorithms. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the nodes 102, 104 can use quantum-resistant cryptographic protocols that cannot be compromised by the example quantum-enabled adversary 108. For instance, the nodes 102, 104 may use a cryptographic protocol that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol that is also secure against attacks by the quantum-enabled adversary 108. In some examples, the nodes 102, 104 can use the example techniques shown in any one or more of FIGS. 2-6, or the nodes 102, 104 may use variations of these and other techniques to communicate on the channel 106.

In some implementations, the nodes 102, 104 use a lattice-based cryptography scheme in their communications over the channel 106. The security of lattice-based cryptography schemes is based on the apparent hardness of certain problems on point lattices in $\mathbb{R}$. Some lattice-based cryptography schemes are believed to be secure against quantum-enabled adversaries. For example, it is believed that no efficient quantum algorithms are known for the hard problems typically used in lattice-based cryptography. Examples of lattice-based cryptography techniques include ring-learning-with-errors-based (Ring-LWE) key agreement protocols, Ring-LWE encryption protocols, NTRU algorithms (e.g., NTRUEncrypt, NTRUSign, etc.), Bimodal Lattice Signature Schemes (BLISS), PASS algorithms (e.g., PASS-Sign, etc.), TESLA (Tightly-secure, Efficient signature scheme from Standard LAttices) protocols, ring-TESLA protocols and others.

Some lattice-based cryptography schemes define a ring of integer polynomials, where each integer coefficient is reduced by a modulus q. An array of such integer coefficients can be used as a parameter in some lattice-based cryptography schemes. For example, an array of randomly-selected integers, each less than the modulus q, is used as a public parameter in some lattice-based key agreement protocols. The array of randomly-selected integers, each less than the modulus q, can be generated based on the output of a pseudorandom number generator (e.g., a pseudorandom bit stream) or another source of randomness. The array can be combined with other values (e.g., a secret value, other system parameters, etc.) in a key agreement protocol to generate a shared secret. For instance, the "New Hope" proposal provides an example algorithm for generating a shared secret based on an array of randomly-selected integers less than the modulus 12289. An array of randomly-selected integers, each less than a modulus can be used in another manner in a lattice-based cryptography scheme, for example, to generate other types of parameters, with other moduli, etc.

The TESLA (Tightly-secure, Efficient signature scheme from Standard LAttices) signature scheme and its variants (including Bai-Galbraith and ring-TESLA signature schemes) are examples of a lattice-based signature schemes that can use an array of randomly-selected (or "random-looking") integers, each less than a modulus. The TESLA signature scheme was introduced as a variant of the Bai-Galbraith signature scheme, and a ring-based variant of TESLA, called ring-TESLA, has also been introduced. Public keys in the TESLA signature scheme and its variants contain a public parameter that can be implemented in a manner that is analogous to the public parameter a in New Hope. For example, TESLA and Bai-Galbraith signature schemes include a public parameter A that is a two-dimensional matrix with entries in $\mathbb{Z}_q$; and ring-TESLA signature schemes include a public parameter a that is an array with 512 elements. TESLA and ring-TESLA signature schemes may specify the respective public parameters A, a as fixed, global parameters of the cryptosystem, but such schemes can be modified so that the respective public parameters A, a are instead unique to each distinct public key. Bai-Galbraith signature schemes may also specify the public parameter A as unique to each distinct public key, rather than a fixed, global parameter. Rather than store and transmit all the data for the public parameter A, a in the TESLA signature scheme and its variants, it may be more efficient in some cases to store and transmit only a short seed and then generate the data for the public parameter via pseudorandom generator, for instance, using the techniques described here. It may be beneficial to also reduce consumption of pseudorandom data when generating public parameters in the TESLA signature scheme and its variants.

Figure 2:
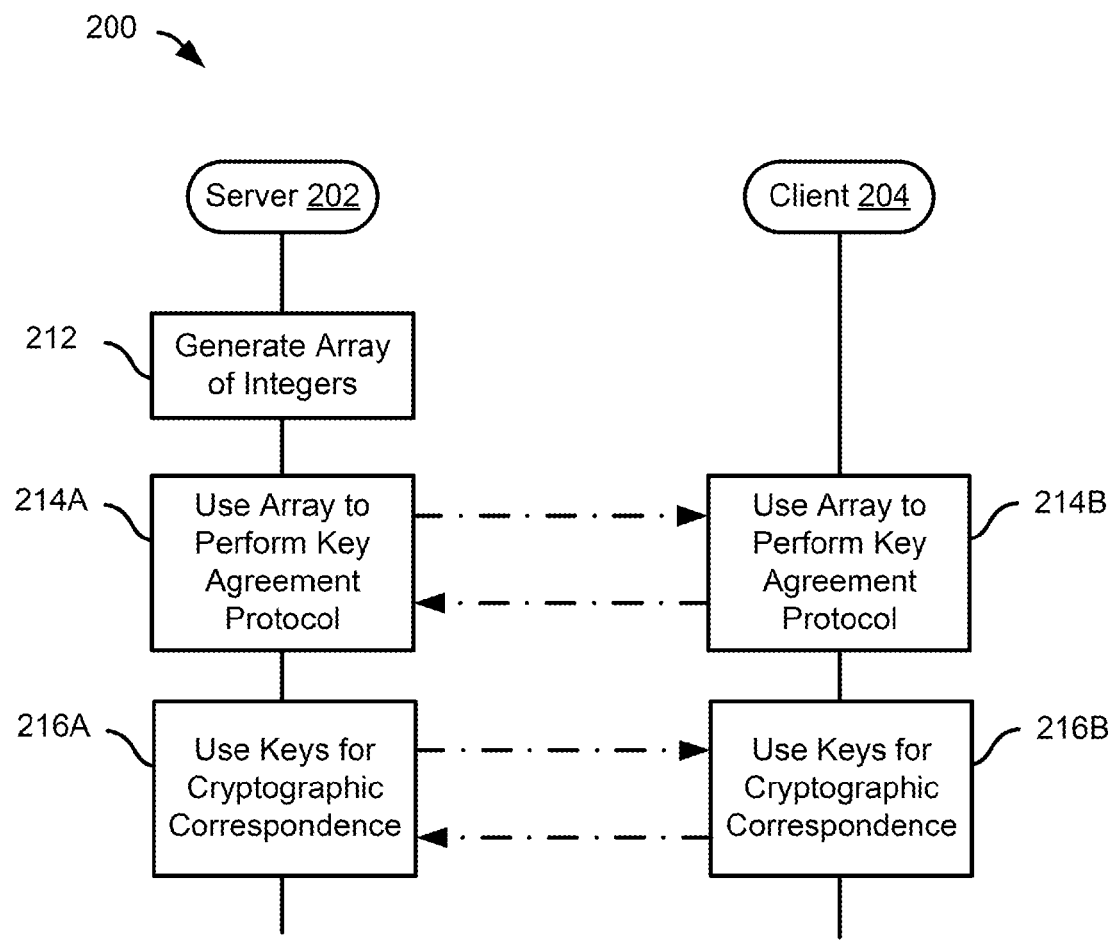
FIG. 2 is a flow diagram showing aspects of an example cryptography process.

FIG. 2 is a flow diagram showing aspects of an example cryptographic process 200. The example cryptographic process 200 can be performed, for example, by computer systems that can exchange information over a communication channel. For instance, operations in the cryptographic process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order.

In some cases, one or more of the operations shown in FIG. 2 are implemented as processes that include multiple operations, sub-processes or other types of routines. For example, the processes shown in FIGS. 3, 4A, 4B, 5 and 6 can be used, in some instances, to perform one or more of the example operations shown in FIG. 2. In some cases, operations can be combined, performed in parallel, iterated or otherwise repeated or performed in another manner.

The example cryptographic process 200 shown in FIG. 2 includes operations performed by a server 202 and a client 204. In the example shown, the server 202 and the client 204 represent two distinct entities in a cryptography system. In the example shown, the server 202 initiates a key agreement protocol, and sends public data to the client 204; the client 204 uses the public data and the key agreement protocol to generate a shared secret or another cryptographic key with the server 202. In some cases, the server 202 and client 204 may have a server-client relationship, a peer-to-peer relationship or another type of relationship.

In some examples, the cryptographic process 200 is secure against quantum-enabled adversaries such as, for example, the quantum-enabled adversary 108 shown in FIG. 1. For instance, in some cases, the example cryptographic process 200 is secure against certain types of attacks or other processes that can be performed by a quantum-enabled adversary who has access to public information exchanged between the server 202 and the client 204. The example cryptographic process 200 may also provide security against classically-enabled adversaries who do not have access to quantum computers or other quantum resources.

At 212, the server 202 generates an array of integers. For example, the server 202 may generate an array of integers according to the example processes shown in FIG. 3, 4A, 5 or 6, or the server 202 may generate an array of integers according to another process. The array of integers can be a one-dimensional vector (e.g., having a single column or a single row of elements), a two-dimensional matrix (e.g., having multiple columns and rows of elements), a three-dimensional matrix (e.g., having multiple columns, rows and layers of elements) or another higher-dimension object. In some examples, the server 202 generates the array of integers by operation of the example system 450 shown in FIG. 4B or by operation of another type of system that includes one or more similar components. For example, the server 202 may include an entropy source, a pseudorandom number generator, an array storage, a cache, an integer generator or a combination of these and other components. In some implementations, the client 204 generates the array of integers.

In the example shown in FIG. 2, the array of integers generated at 212 includes a specified number of integers, each less than a specified modulus. For instance, the number of integers and the modulus can be specified by a key agreement protocol or another cryptographic protocol to be performed. In some implementations, the array of integers is generated as a parameter in a lattice-based cryptographic protocol, such as, for example, the public parameter a in the New Hope proposal or another public parameter to be shared between the client 204 and server 202. In some implementations, the array of integers is generated as a parameter in another type of cryptographic protocol (e.g., other than lattice-based).

In some instances, a modified version of the technique described in the New Hope proposal can be used to generate the array of integers at 212. For example, each element of the array may be generated by the following process:

(1) Retrieve two bytes of pseudorandom data from the seeded SHAKE-128 function;

(2) Discard two bits of the retrieved pseudorandom data, and interpret the remaining 14 bits as an integer x in $\{0, \ldots, 2^{14}-1\}$;

(3) If x>12288, then return to step 2 and construct the integer x by discarding a different choice of two bits from the 16 bits of pseudorandom data, and continue (e.g., for a fixed number of attempts) until a choice of discard bits is found yielding an acceptable x≤12288. If all such attempts fail, return to step 1; and (4) Return x.

As an alternative for step (3) above, if x>12288, then discard one byte of the pseudorandom data obtained at step (1), obtain an additional, fresh byte of pseudorandom data and return to step 2. Either of these alternatives can be modified or combined with other techniques, for example, with one or more of the processes described below.

In some implementations, the server 202 generates the array of integers by an iterative process that utilizes multiple number systems—e.g., multiple number systems of base-m, where m has a different value (2, 3, 4, 5 or a higher integer) for each number system. The server 202 may generate the array of integers by a process that uses pseudorandom data from a pseudorandom number generator. In some cases, the process improves utilization of the pseudorandom data. For instance, the process may retrieve enough pseudorandom data for a batch of integers and then parse the pseudorandom data in such a way that reduces or minimizes the probability of rejecting a given sample of pseudorandom data, thus reducing the expected total use of pseudorandom data.

In some implementations, the pseudorandom data are retrieved from a pseudorandom number generator that provides pseudorandom data in portions no smaller than a minimum retrieval limit (e.g., one byte). In such cases, an individual operation may over-consume pseudorandom data, for instance, when the operation needs less than the minimum retrieval limit. In some cases, caching can be used to avoid discarding surplus pseudorandom data. For example, in an iterative process, surplus pseudorandom bits obtained from a pseudorandom number generator in one iteration can be saved for use in one or more subsequent iterations, for example, by caching the surplus bits.

In some examples, each integer in the array of integers generated at 212 is less than a modulus q. For instance, the modulus q=12289 is used in the example processes 400, 500 shown in FIGS. 4A, 5, respectively. Another value of the modulus q may be used, for example, based on parameters of another cryptographic protocol. For instance, another value of the modulus q may be used in an implementation of a key agreement protocol based on the New Hope proposal instantiated with different parameters, or in another cryptographic protocol that utilizes an array of integers from pseudorandom data.

In some implementations, a process for generating an array of integers each less than a modulus q (an array of integers, each in $\{0, \ldots, q-1\}$) can be specified based on the modulus value and other parameters or criteria. For example, a process can be adapted to use pseudorandom data efficiently, for instance, to reduce or minimize the amount of pseudorandom data that is discarded.

In some implementations, the following example procedure can be used to specify parameters of the process that is used at 212 to generate the array of integers. First, given a value of the modulus q, choose a nearby modulus q' having a factorization $q'=q_1 \times \ldots \times q_n$. For example, in the example processes 400, 500 shown in FIGS. 4A, 5, respectively, the target modulus is q=12289, and the nearby modulus q'=12288 is chosen. In some cases, the nearby modulus q' can be close enough to the target modulus q, for example, to provide adequate security when the array of integers is used in a cryptographic protocol. For example, as noted below, the choice of q'=12288 has not been found to compromise security of the key agreement protocol described in the New Hope proposal. Second, identify factors of the nearby modulus $q'=q_1 \times \ldots \times q_n$. For example, in the example processes 400, 500 shown in FIGS. 4A, 5, respectively, the factors of the nearby modulus are $q'=12288=3\times 2^{12}$. Third, for each identified factor $q_i$ (where i=1, . . . , n), find a power $e_i$ of $q_i$ and a power $f_i$ of two such that $q_i^{e_i}$ is close to but no greater than $2^{f_i}$. For example, in the example process 400 shown in FIG. 4A, the values $\{q_1=3; e_1=5; f_1=8\}$ provide $3^5 \approx 2^8$, and $\{q_2=2^{12}; e_2=1; f_2=12\}$ trivially provides $2^{12}=2^{12}$; in the example process 500 shown in FIG. 5, the values $\{q_1=3; e_1=17; f_1=27\}$ provide $3^{17} \approx 2^{27}$, and $\{q_2=2^{12}; e_2=1; f_2=12\}$ trivially provides $2^{12}=2^{12}$. In some cases, other values of $e_i$, $q_i$ and $f_i$ are chosen, for example, based on another target value of the modulus q or other criteria.

When the parameters are specified by the example procedure described above, the array can be generated at 212 by the following process. First, perform the following iterative sub-process for each identified factor $q_i$ (i.e., for each i=1, . . . , n):

(a) Retrieve $f_i$ bits of pseudorandom data that represent an integer y in $\{0, \ldots, 2^{f_i}-1\}$. For example, at 402 in the example process 400 in FIG. 4A, for $\{q_1=3; e_1=5; f_1=8\}$, eight bits of pseudorandom data are obtained.

(b) If $y_i \geq q_i^{e_i}$ then reject the pseudorandom data and return to (a). For example, at 404 in the example process 400 in FIG. 4A, for $\{q_1=3; e_1=5; f_1=8\}$, the eight pseudorandom bits obtained at 402 are rejected if they represent an integer $y \geq 3^5$ in binary.

(c) Convert the integer y to base-$q_i$ notation, yielding $e_i$ integers $t_1, \ldots, t_{e_i}$ in $\{0, \ldots, q_i-1\}$. For example, at 406 in the example process 400 in FIG. 4A, for $\{q_1=3; e_1=5; f_1=8\}$, the eight pseudorandom bits obtained at 402 are converted to base-3, yielding five trits in $\{0, 1, 2\}$.

Second, when the iterative sub-process above has produced at least one sample of each $t_i$ in $\{0, \ldots, q_i-1\}$, compute an integer x in $\{0, \ldots, q'-1\}$. For example, at 414 in the example process 400 in FIG. 4A, integers can be computed according to Equation (2). In some examples, the integer x can be computed according to the following equation:

$$x = \sum_{i=1}^{n} t_i \prod_{j=1}^{i-1} q_j. \quad (1)$$

Equation (1) can be used (e.g., iteratively) to produce multiple integers x based on a batch of values for $t_i$ obtained from the iterative sub-process. When the batch of values for $t_i$ has been used, the process can be repeated to generate additional integers (e.g., the iterative sub-process (a), (b), (c) can be repeated, and the additional integers can be computed according to Equation (1)). In some implementations, before performing the iterative sub-process, a pseudorandom number generator is refreshed with a seed value, and the pseudorandom data is retrieved at step (a) from the pseudorandom number generator. In some implementations, the array of integers is generated at 212 by another type of process.

At 214A and 214B, the server 202 and client 204 perform a key agreement protocol using the array of integers generated at 212. For example, the array of integers generated at 212 may be used in the key agreement protocol described in the New Hope proposal, or the array of integers may be configured for use in another type of key agreement or other cryptographic protocol. In some implementations, the key agreement protocol produces a public-private key pair or a shared secret that can subsequently be used for cryptographic correspondence. For instance, performing the key agreement protocol may provide a private key at the server 202 and a public key at the client 204, or a shared secret at the server 202 and client 204.

In some implementations, the array of integers is used as a public parameter in the key agreement protocol. The server 202 may use a seed value to refresh the state of a pseudorandom number generator before generating the array of integers at 212, and the server 202 may send the client 204 the seed value (e.g., over a public channel), which the client 204 can then use to generate the array of integers. The seed value can be, for example, a 32-byte seed for a pseudorandom number generator (e.g., as shown in FIG. 4B) or another size or type of seed value. In some implementations, the server 202 may send all or part of the seed value, the array of integers or other information to the client 204 over a public channel. For instance, the seed value, the array of integers and other information communicated between the server 202 and client 204 at 214A, 214B can be public data.

At 216A and 216B, the keys generated by the key agreement protocol (at 214A, 214B) are used for cryptographic correspondence. For example, the keys generated by the key agreement protocol may be used to encrypt or decrypt a message, to sign or verify a message or to generate other parameters that are used for cryptographic correspondence. The keys may be used in another manner.

In some implementations, at 216A and 216B, the keys generated by the key agreement protocol (at 214A, 214B) are used for cryptographic correspondence in a lattice-based cryptographic protocol. For example, a cryptographic key may be used for encryption, decryption, digital signing, verifying or other operations in a lattice-based cryptography system. In some examples, a cryptographic key is configured for use in ring-learning-with-errors-based (Ring-LWE) encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) or ring-TESLA protocols or another lattice-based cryptographic protocol.

Figure 3:
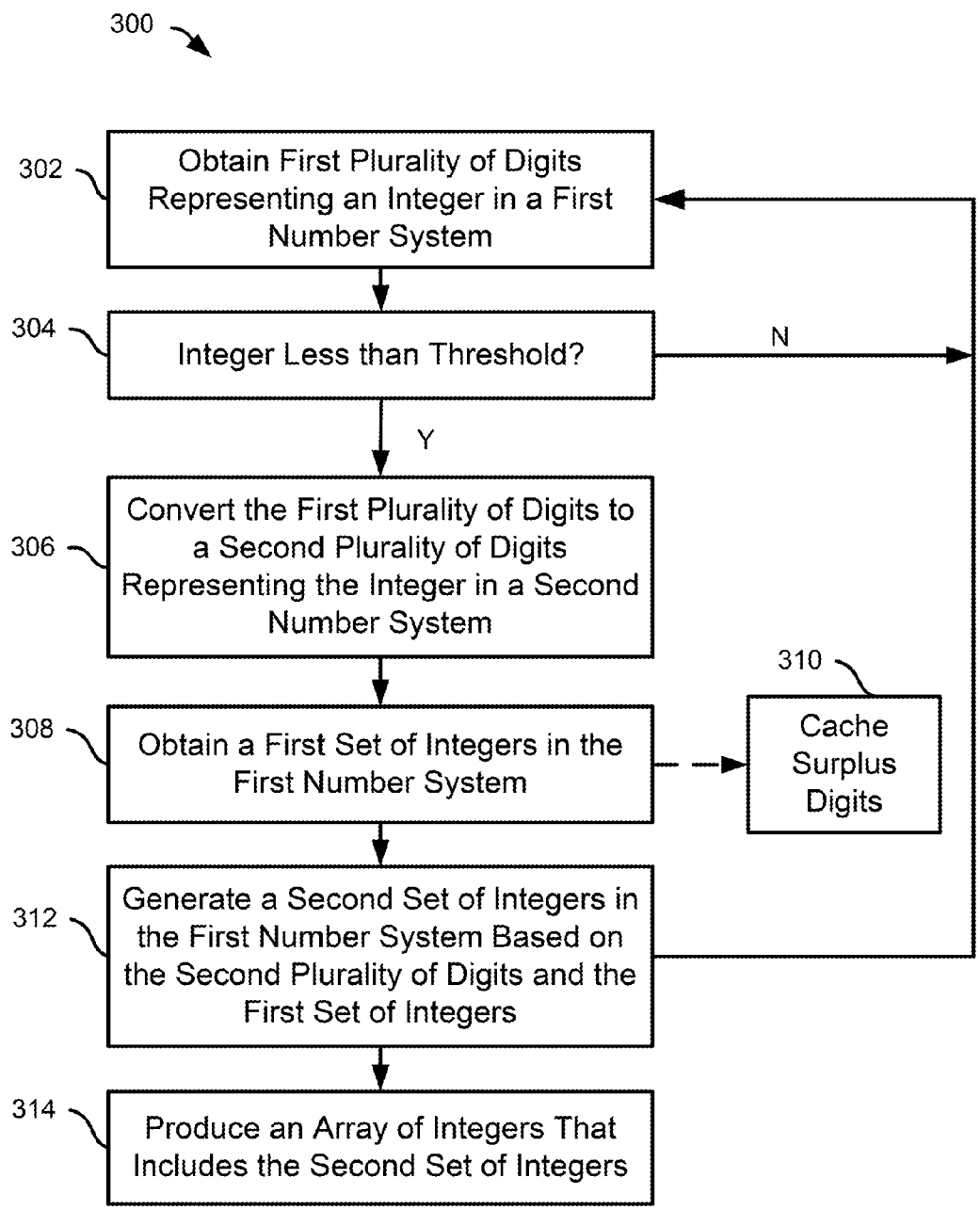
FIG. 3 is a flow diagram showing an example process for generating an array of integers.

FIG. 3 is a flow diagram showing an example process 300 for generating an array of integers. The example process 300 can be performed, for example, by a computer system that includes a memory and a processor. For instance, operations in the process 300 may be performed by either of the nodes 102, 104 in the example communication system 100 shown in FIG. 1 or in another type of system. In some cases, the example process 300 can be performed or utilized as part of a cryptographic protocol (e.g., by an entity performing a key agreement protocol) or in another type of process.

The example process 300 may include additional or different operations, and the operations may be performed in the order shown or in another order. In some cases, one or more of the operations shown in FIG. 3 are implemented as processes that include multiple operations, sub-processes for other types of routines. In some cases, operations can be combined, performed in another order, performed in parallel, iterated or otherwise repeated or performed in another manner.

In some implementations, the process 300 receives a stream of pseudorandom data as input, and generates an array of integers (e.g., an array of non-negative integers) as output. The stream of pseudorandom data can be or include, for example, a stream of pseudorandom bits from a pseudorandom number generator or another source. In some implementations, the pseudorandom number generator is seeded, for example, by a seed value, before the process 300 begins, and the process 300 uses pseudorandom data from the seeded pseudorandom number generator to produce an array of "random-looking" integers based on the seed value. The array of integers can be "random-looking," for example, from the perspective of an adversary or another entity. The array can be an array of non-negative integers where each integer in the array belongs to $\{0, \ldots, q-1\}$, or an array of integers in another range less than a modulus value q.

Figure 4A:
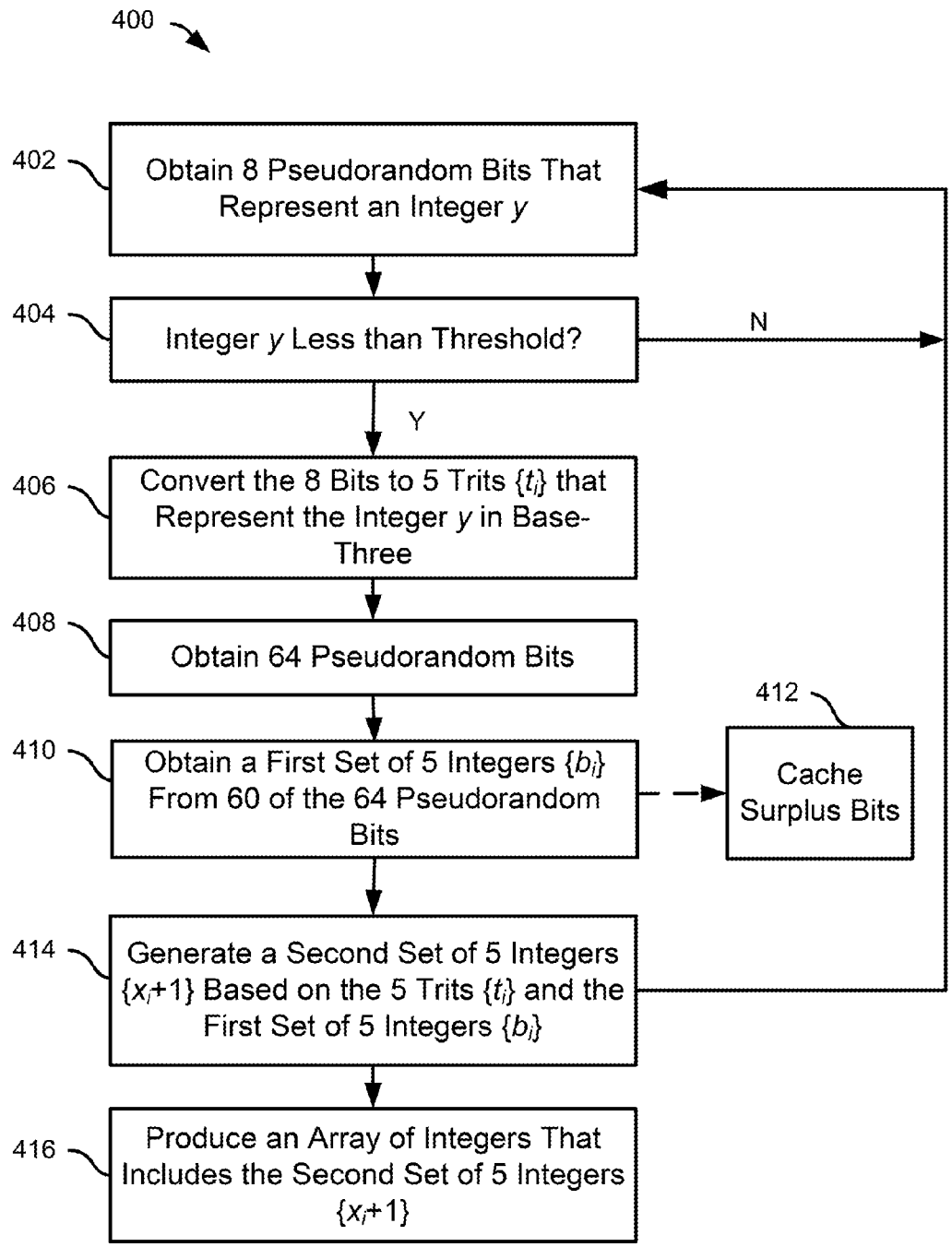
FIG. 4A is a flow diagram showing another example process for generating an array of integers.
Figure 4B:
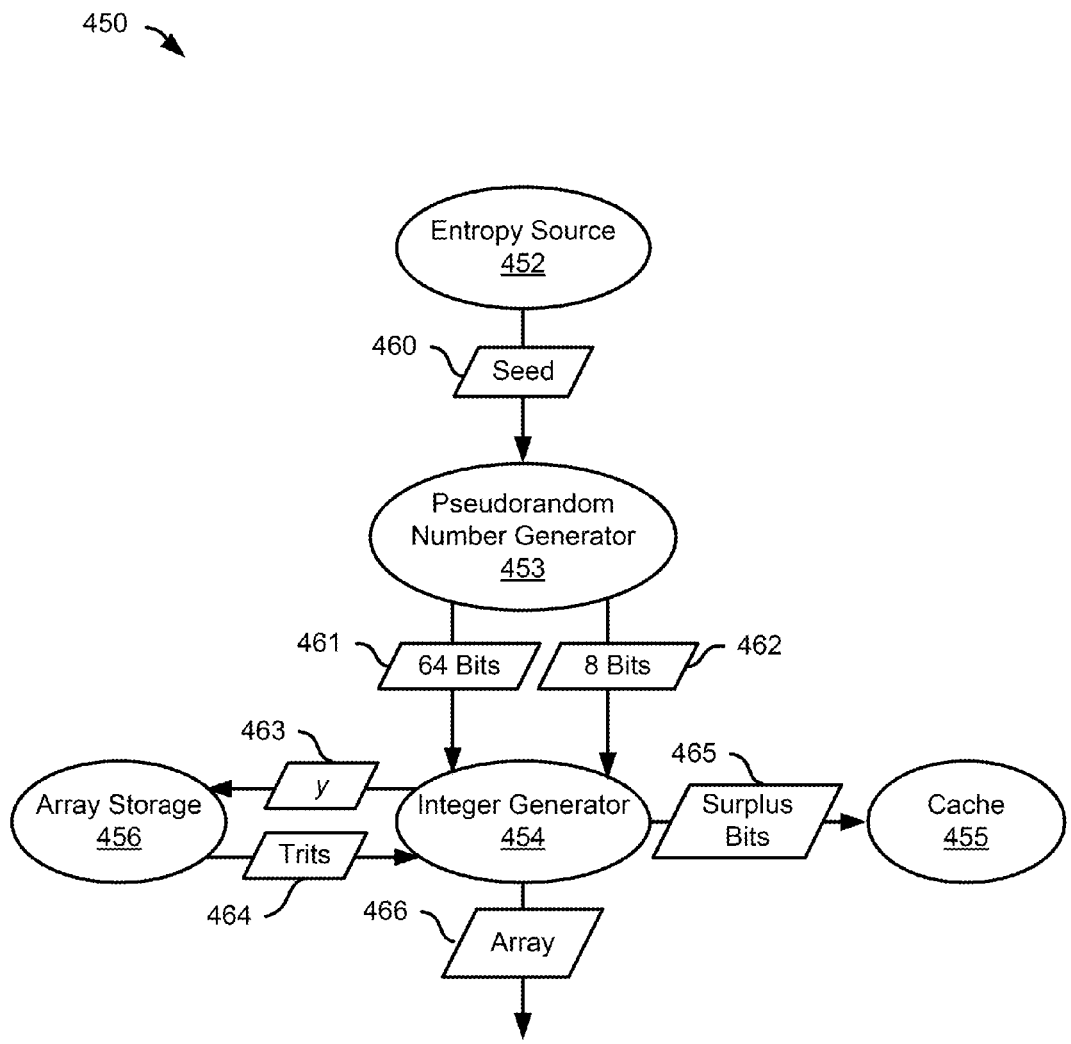
FIG. 4B is a block diagram showing an example system configured to perform the example process 400 shown in FIG. 4A.
Figure 5:
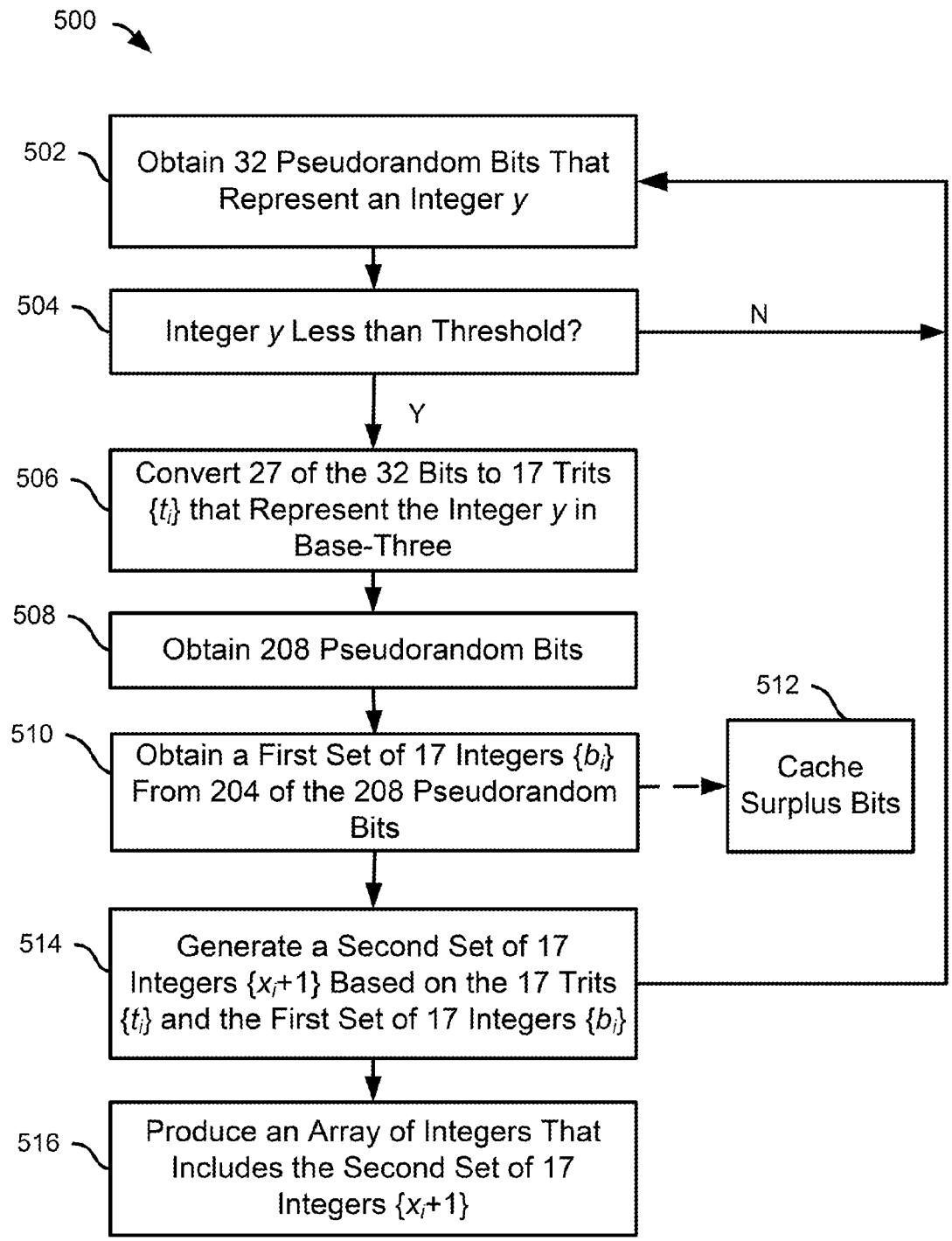
FIG. 5 is a flow diagram showing another example process for generating an array of integers.

In some cases, the process 300 can be implemented according to the example processes 400, 500 shown in FIGS. 4A, 5, respectively, or the process 300 can be implemented in another manner, for example, using other parameters or values.

At 302, a first plurality of digits are obtained; the first plurality of digits represent an integer y in a first number system. The first plurality of digits can be binary digits (i.e., bits), trinary digits (e.g., trits) or digits in another number system. For example, obtaining the first plurality of digits may include obtaining pseudorandom bits from a pseudorandom number generator, and the pseudorandom bits may represent an integer in a base-two (i.e., binary) number system. In the example shown in FIG. 4A, eight pseudorandom bits are obtained; in the example shown in FIG. 5, thirty-two pseudorandom bits are obtained. In some cases, another number of bits (or other digits) are obtained at 302.

At 304, a determination is made whether the integer represented by the first plurality of digits is less than a threshold value. For example, the integer y can be compared to a threshold value. If the integer y is less than the threshold value, the process 300 proceeds to 306; if the integer y is greater than or equal to the threshold value, the process 300 returns to 302. In some cases, the process 300 may iterate the operations 302, 304 until the integer represented by the digits obtained at 302 is less than the threshold value. In the example shown in FIG. 4A, the threshold value can be $243=3^5$; in the example shown in FIG. 5, the threshold value can be $129140163=3^{17}$. In some cases, another threshold value is used.

At 306, the first plurality of digits is converted to a second plurality of digits; the second plurality of digits represents the integer in a second number system. Thus, the first plurality of digits and the second plurality of digits represent the same value (the integer y) in different number systems. The first plurality of digits can be binary digits (i.e., bits), trinary digits (e.g., trits) or digits in another number system that is different from the first number system. For example, when the first plurality of digits (obtained at 302) are bits (which represent the integer y in a base-two number system), the second plurality of digits can be trits (which represent the integer in a base-three number system) or digits in another number system (e.g., base-4, base-5, etc.). In the example shown in FIG. 4A, converting the first plurality of digits to a second plurality of digits includes converting eight pseudorandom bits to five trits. In some cases, the second plurality of digits includes a different number of trits or another type of digits.

In some implementations, converting the first plurality of digits to the second plurality of digits comprises accessing pre-computed values of the second plurality of digits from a storage medium. For example, the pre-computed values can be computed before the process 300 begins execution and stored for later use, for example, to be used during execution of the process 300. In some cases, accessing pre-computed values provides an improvement in run time, for example, compared with computing the second plurality of digits during execution of the process 300. For two number systems, the pre-computed values for converting between them are fixed and could therefore be hard-coded into software or embedded into hardware.

In the example shown in FIG. 4B, the pre-computed values for converting between number systems are stored in an array storage. The pre-computed values may be stored in another type of storage medium or other device. The pre-computed values may be accessed from the storage medium based on the integer y, as represented by the first plurality of digits. For instance, the first plurality of digits can be used with a lookup table or another access procedure to obtain the second plurality of digits that represent the integer y in the second number system.

At 308, a first set of integers in the first number system is obtained. The first set of integers may include a single integer or multiple integers. In the examples shown in FIGS. 4 and 5, the number of integers in the first set of integers (308) is equal to the number of digits in the second plurality of digits (306). In the example shown in FIG. 4A, the first set of integers includes five integers; in the example shown in FIG. 5, the first set of integers includes seventeen integers. In some cases, the set of integers may include another number of integers.

In some implementations, obtaining the first set of integers at 308 includes obtaining a series of pseudorandom bits from a pseudorandom number generator and parsing the series of pseudorandom bits (e.g., to obtain words). Each integer in the first set can include a respective subset of the pseudorandom bits (e.g., a respective word parsed from the series of pseudorandom bits). In the example shown in FIG. 4, five integers are obtained from 64 pseudorandom bits; in the example shown in FIG. 5, seventeen integers are obtained from 208 pseudorandom bits. In some implementations, some of the pseudorandom bits are obtained from a cache, for example, based on the digits cached at 310 or other cached values.

At 310, surplus digits are cached. For example, surplus pseudorandom data from a pseudorandom number generator can be cached for later use. In some cases, the first set of integers is obtained at 308 based on a series of pseudorandom bits from a pseudorandom number generator, and some of the pseudorandom bits might not be used to generate the first set of integers. In such cases, the surplus (unused) pseudorandom bits can be stored in a cache for later use. Caching surplus pseudorandom bits from a pseudorandom number generator can improve efficiency, for example, by reducing the amount of pseudorandom data obtained from the pseudorandom number generator in a later iteration of the process 300. In some implementations, surplus digits may be discarded or handled in another manner.

In some implementations of the process 300, a first set of integers is obtained (at 308) for a current iteration of an iterative process, and surplus digits are cached (at 310) for a subsequent iteration of the iterative process. For example, pseudorandom digits for the current iteration can be obtained from a pseudorandom number generator, the first set of integers can be designated for the current iteration from a first subset of the pseudorandom digits, and a second subset of the pseudorandom digits can be cached for a subsequent iteration of the iterative process. In the subsequent iteration of the iterative process, the first set of integers can be obtained based on pseudorandom digits from the pseudorandom number generator, from the cache or from both. For example, a first subset of pseudorandom digits can be obtained from the pseudorandom number generator, and a second subset of pseudorandom digits can be obtained from the cache (based on surplus digits stored in the earlier iteration), and the first set of integers can be designated from the first and second subsets of digits.

At 312, a second set of integers in the first number system is generated. The second set of integers is generated based on the second plurality of digits (from 306) and the first set of integers (from 308). In some implementations, each integer in the second set of integers is generated based on Equation (1) or a variation of Equation (1). In some implementations, each integer in the second set of integers is generated based on a respective one of the second plurality of digits and a respective one of the integers in the first set. For instance, each integer in the second set of integers $\{x_i+1\}$ can be generated based on an equation, by adding each integer from the first set of integers $\{b_i\}$ to a product of a respective digit in the second plurality of digits $\{t_i\}$ multiplied by a common value $2^{12}$. In the examples shown in FIGS. 4 and 5, each integer in the second set of integers $\{x_i+1\}$ is generated based on Equation (2), shown below, where the common value is $2^{12}$; and each integer in the second set of integers is less than a modulus 12289. In some cases, another equation or other values may be used, and the integers may be less than another modulus value.

At 314, an array of integers is produced; the array of integers includes at least the second set of integers generated at 312. In the example shown in FIG. 3, each of the integers in the array is a non-negative value less than a modulus value. For example, the array of integers may be formatted for use as a public parameter in a cryptographic protocol, such as, for example, a lattice-based key agreement protocol. The array of integers can be one-dimensional, two-dimensional, three-dimensional or higher-dimensional. The example key agreement protocol described in the New Hope proposal uses an array of 1024 integers each less than the modulus 12289. In some implementations, the array of integers is formatted for use as a parameter in another type of cryptographic protocol (e.g., other than lattice-based).

In some implementations of the process 300, the array of integers is produced by an iterative process that includes multiple iterations of one or more operations shown in FIG. 3. For example, each iteration may include performing each of the operations at 302, 304, 306, 308, 310, 312 and 314 for the iteration, and the array of integers may include the second set of integers generated for multiple iterations of the iterative process.

FIG. 4A is a flow diagram showing another example process 400 for generating an array of integers. The example process 400 can be performed, for example, by a computer system that includes a memory and a processor. For instance, operations in the process 400 may be performed by either of the nodes 102, 104 in the example communication system 100 shown in FIG. 1 or in another type of system. In some cases, the example process 400 can be performed or utilized as part of a cryptographic protocol (e.g., by an entity performing a key agreement protocol) or in another type of process.

The example process 400 may include additional or different operations, and the operations may be performed in the order shown or in another order. In some cases, one or more of the operations shown in FIG. 4A are implemented as processes that include multiple operations, sub-processes for other types of routines. In some cases, operations can be combined, performed in another order, performed in parallel, iterated or otherwise repeated or performed in another manner.

In some implementations, the process 400 receives a stream of pseudorandom data as input, and generates an array of non-negative integers as output. The stream of pseudorandom data can be or include, for example, a stream of pseudorandom bits from a pseudorandom number generator or another source. In some implementations, the pseudorandom number generator is seeded, for example, by a seed value, before the process 400 begins, and the process 400 uses pseudorandom data from the seeded pseudorandom number generator to produce an array of "random-looking" integers based on the seed value. The array of integers can be "random-looking," for example, from the perspective of an adversary or another entity. The array can be an array of non-negative integers where each integer in the array belongs to $\{0, \ldots, q-1\}$, or an array of integers in another range less than a modulus value q.

The example process 400 makes use of the fact that $12288=3\times2^{12}$, and therefore each integer x in $\{0, \ldots, 12287\}$ is uniquely represented by twelve bits and one trit via the formula $$x=t\times2^{12}+b, \quad (2)$$

where the integer b in $\{0, \ldots, 2^{12}-1\}$ is represented by twelve bits and t in $\{0, 1, 2\}$ is represented by a single trit. The example process 400 also makes use of the fact that $3^5=243\approx256=2^8$, which means that one can sample five uniformly random trits from eight uniformly random bits with high probability. For instance, there is a 5% probability that eight random bits will fail to produce five random trits of data.

At 402, eight pseudorandom bits are obtained; the eight pseudorandom bits can be interpreted as an integer y. The pseudorandom bits may be obtained from a pseudorandom number generator or another source. For example, the pseudorandom bits may be retrieved by directly retrieving a byte of pseudorandom data from a pseudorandom number generator, by retrieving cached bits (e.g., from a cache) that were previously retrieved from the pseudorandom number generator, or otherwise.

At 404, a determination is made whether the integer represented by the eight pseudorandom bits is less than a threshold value. In the example shown in FIG. 4A, the threshold value is $243=3^5$, which is the highest integer value that can be represented by five trits (five digits in a base-three number system). Thus, if y>242, then the one-byte sample obtained at 402 is rejected. Another threshold value may be used in some cases.

At 406, the eight pseudorandom bits are converted to five trits $\{t_i\}$; the five trits represent the integer y in a trinary number system. Thus, the eight pseudorandom bits and the five trits represent the same integer y in base-two and base-three number systems. In some implementations, converting the eight pseudorandom bits to five trits includes accessing pre-computed values of the trits from a storage medium, such as, for example from an array storage as shown in FIG. 4B. For example, the array storage can store a pre-computed 243-element array whose $y^{th}$ element is a list of the five trits $\{t_i\}$ corresponding to the trinary representation of y. In such examples, the conversion operation at 406 may be performed, for example, by indexing into the 243-element array. In some implementations, converting the eight pseudorandom bits to five trits includes converting from base-two notation to base-three notation, for example, by a conversion calculation.

At 408, sixty-four pseudorandom bits are obtained. The pseudorandom bits may be obtained from a pseudorandom number generator or another source. For example, the pseudorandom bits may be retrieved by directly retrieving eight bytes of pseudorandom data from a pseudorandom number generator, by retrieving cached bits (e.g., from a cache) that were previously retrieved from the pseudorandom number generator, or otherwise. In some cases, another number (fewer or more) than sixty-four pseudorandom bits are obtained at 408. For example, seven bytes (fifty-six bits) of pseudorandom data may be retrieved from a pseudorandom number generator, and four bits of pseudorandom data may be retrieved from a cache.

At 410, a first set of five binary integers $\{b_i\}$ is obtained from the pseudorandom bits obtained at 408. For example, sixty of the of the sixty-four (or other number of) pseudorandom bits obtained at 408 may be interpreted as five integers. In the example shown in FIG. 4A, each of the five binary integers $\{b_i\}$ is a twelve-bit binary number, and the integers can be obtained, for example, by parsing sixty pseudorandom bits into groups of twelve (e.g., to obtain five 12-bit words). In some cases, a portion of the pseudorandom bits obtained at 408 are not used to generate the first set of integers $\{b_i\}$ at 410.

At 412, surplus bits are cached. For example, if one or more of the pseudorandom bits obtained at 408 are not used to generate the first set of integers $\{b_i\}$ at 410, the surplus pseudorandom bits can be stored in a cache for later use. For instance, when sixty-four pseudorandom bits are obtained at 408, four surplus bits can be cached at 412. In some cases, a different number of surplus pseudorandom bits are cached. In some implementations, surplus bits are discarded or handled in another manner.

In some implementations of the process 400, pseudorandom bits are obtained (at 408) for a current iteration of an iterative process, and the surplus bits are cached (at 412) for a subsequent iteration of the iterative process. In the subsequent iteration, the cached pseudorandom bits can be obtained (at 408) from the cache and used to generate integers (at 410) for that iteration.

At 414, a second set of binary integers $\{x_i+1\}$ is generated. The second set of integers is generated based on the trits $\{t_i\}$ (from 406) and the first set of integers $\{b_i\}$ (from 410). In some implementations, each integer in the second set of integers is generated based on a respective one of the trits $\{t_i\}$ and a respective one of the integers in the first set $\{b_i\}$. In the example shown in FIG. 4A, each of the integers in the second set is uniquely specified by Equation (2) above. For example, generating the second set of integers may include computing five integers $\{x_i\}$, where $x_i = t_i \times 2^{12} + b_i$, and the second set of integers $\{x_i+1\}$ may be generated from the five computed integers $\{x_i\}$ by adding one to each.

At 416, an array of integers is produced; the array of integers includes at least the second set of integers $\{x_i+1\}$ generated at 414. Each of the integers in the array is a positive value less than a modulus value (e.g., less than 12289 or another modulus value). The array of integers may then be formatted for use as a public parameter in a lattice-based key agreement protocol or another type of cryptographic protocol. In some implementations, each integer in the array produced by the process 400 belongs to $\{1, \ldots, 12288\}$, and the array can be used as the public parameter a in the New Hope proposal.

Although the New Hope proposal specifies integers belonging to $\{0, \ldots, 12288\}$ and therefore permits integers having a value of zero, using an array of non-zero integers belonging to $\{1, \ldots, 12288\}$ does not significantly compromise security. For instance, suppose that an array a with entries drawn uniformly at random from $\{0, \ldots, 12288\}$ as specified by the New Hope proposal is "bad" for security with probability p. Then it can be shown that an array with entries drawn uniformly at random from $\{1, \ldots, 12288\}$ is "bad" for security with probability no larger than 1.1×p. Security of the New Hope scheme rests upon the presumption that p is negligibly small. But if p is negligibly small then so too must be 1.1×p, thus an array of non-zero integers belonging to $\{1, \ldots, 12288\}$ does not significantly compromise security. In some contexts, using an array of non-zero integers belonging to $\{1, \ldots, 12288\}$ may enhance security in some cases, for example, in key caching optimizations or other settings.

In some implementations of the process 400, the array of integers is produced by an iterative process that includes multiple iterations of one or more operations shown in FIG. 4A. For example, each iteration may include performing each of the operations at 402, 404, 406, 408, 410, 412 and 414 for the iteration, and the array of integers may include the second set of integers $\{x_i+1\}$ generated for multiple iterations of the iterative process.

In some implementations, the array includes 1024 integers, and the array is filled by executing multiple iterations of the process 400. For example, 1020 elements of the array may be obtained by 204 iterations of the process 400, and the remaining four elements to fill the entire 1024-element array can be obtained by using an additional iteration of the process 400 (e.g., discarding the unneeded fifth integer) or by using another technique. In an example implementation, there is an approximately 5% probability of rejecting (at 404) the eight pseudorandom bits obtained at 402. Thus, when caching is not used, the process 400 can be expected to consume 1856 bytes of pseudorandom data over 205 iterations on average.

When caching is used in the process 400, the consumption of pseudorandom data can be reduced further. In the example shown in FIG. 4A, sixty-four bits of pseudorandom data are obtained at 408, for instance, when the pseudorandom data are retrieved from a pseudorandom number generator and the pseudorandom number generator provides pseudorandom data in portions no smaller than one byte (8 bits). Because only 7.5 bytes (60 bits) are used at 410, the four bits surplus bits can be saved for subsequent iterations of the process 400, for example, by caching the surplus bits at 412. In this manner, 102 bytes of pseudorandom data can be saved over 205 executions of the process 400 (e.g., to produce a 1024-element array). In this example, when caching is used, the process 400 can be expected to consume 1754 bytes of pseudorandom data over 205 iterations on average.

In some cases, the pseudorandom number generator has another minimum retrieval limit (e.g., more or less than one byte), and the retrieval of pseudorandom data and caching operations in the process 400 can be modified, for example, such that sufficient pseudorandom data are retrieved in each step and any unneeded pseudorandom data are cached for subsequent iterations or executions. In some implementations, the minimum retrieval limit for pseudorandom data may vary according to the specifications of the pseudorandom number generator, the underlying machine architecture or other considerations. For example, in some cases, the minimum retrieval limit from a pseudorandom number generator is four bytes instead of one byte. In such cases, the retrieval of pseudorandom data and caching operations can be modified accordingly.

FIG. 4B is a block diagram showing an example system 450 configured to perform the example process 400 shown in FIG. 4A. In some instances, the example system 450 can be configured or re-configured to perform the example process 300 shown in FIG. 3, the example process 500 shown in FIG. 5, the example process 600 shown in FIG. 6 or another process that generates an array of integers. In some cases, the example system 450 can be implemented in a computer system that includes a memory and a processor. For instance, the components in the system 450 may be included in either of the nodes 102, 104 in the example communication system 100 shown in FIG. 1 or in another type of system.

The example system 450 shown in FIG. 4B includes an entropy source 452, a pseudorandom number generator 453, an integer generator 454, a cache 455 and an array storage 456. The system 450 may include additional or different components, and the components may be configured to operate as shown in FIG. 4B or in another manner. In some cases, the entropy source 452, the pseudorandom number generator 453 or the integer generator 454 can be implemented by software, for example, as one or more codes or scripts executed on a general purpose processor, a specialized co-processor or another type of data processing apparatus. In some cases, the entropy source 452, the pseudorandom number generator 453 or the integer generator 454 can be implemented in hardware or firmware, for example, as one or more programmable logic devices, digital or analog circuitry or another type of data processing apparatus. In some cases, the cache 455 or the array storage 456 (or both) can be implemented in a computer-readable memory device that is accessed or otherwise utilized, for example, by a general purpose processor or by another type of data processing device. In some cases, the cache 455 or the array storage 456 (or both) can be implemented as a storage device or another type of hardware device.

The example entropy source 452 can include software, hardware or firmware configured to provide information that has entropy. For instance, the entropy source 452 may include systems or processes that provide information that cannot be reliably predicted in advance by an adversary. The entropy content of the information provided by the entropy source 452 can be based on signals from an environment (e.g., ambient noise detected by a microphone, temperature or light detected by electronic sensors, etc.), from an input device (e.g., sounds detected by a microphone, mouse movements, keyboard strokes, touchpad gestures, etc.), from a hardware random number generating device (e.g., ring-oscillator) or from another source.

In the example shown in FIG. 4B, the entropy source provides a seed 460 to the pseudorandom number generator 453. The seed 460 can be, for example, a 32-bit seed value, a 64-bit seed value or a seed of another size. The seed 460 can be, for example, a parameter that is shared between correspondents in a cryptographic protocol, such as, for example, in a key agreement protocol. Thus, in some cases, an entity obtains the seed 460 from another entity in a cryptography system as a parameter in the cryptographic protocol. In some implementations, the value of the seed 460 and the protocol executed by the integer generator 454 determine the values of the integers in the array 466 produced by the integer generator 454.

The example pseudorandom number generator 453 can operate deterministically and provide an output that appears random, for example, from an adversary's perspective. In the example shown in FIG. 4B, the pseudorandom number generator 453 provides pseudorandom data to the integer generator 454, and the pseudorandom data depends on the state of the pseudorandom number generator 453. For instance, the output values generated by the pseudorandom number generator 453 may correspond to a state of the pseudorandom number generator 453. The state can be modified, for example, by seeding the pseudorandom number generator 453. In the example shown in FIG. 4B, the state of the pseudorandom number generator 453 is modified by the seed 460 from the entropy source 452.

The example pseudorandom number generator 453 may provide pseudorandom data, for example, in single-byte portions or in multi-byte portions on demand. In some implementations, the pseudorandom number generator 453 has a minimum retrieval limit, and the pseudorandom samples provided by the pseudorandom number generator 453 are larger than the minimum retrieval limit. An example of a pseudorandom number generator is the cryptographic hash function SHAKE-128 noted in the New Hope proposal. Other types of pseudorandom number generators may be used in some cases. For example, the pseudorandom number generator 453 may execute the cryptographic hash function SHAKE-128, SHAKE-256, SHA3-256, ChaCha20, HMAC-DRBG, any of the SHA-2 family (e.g., SHA-256, SHA-512) of algorithms or possibly others.

The integer generator 454 can generate integers in a specified format. In some implementations, the integer generator 454 can generate an array of integers as described with respect to the example process 200 (e.g., at 212) in FIG. 2. For instance, the integer generator 454 may be configured to perform some or all of the operations in the example process 300 shown in FIG. 3, the example process 400 shown in FIG. 4A, the example process 500 shown in FIG. 5, the example process 600 shown in FIG. 6 or another type of process for generating integers.

In the example shown in FIG. 4B, the integer generator 454 obtains inputs from the pseudorandom number generator 453, including an eight-bit sample 462 and a sixty-four-bit sample 461. The example integer generator 454 also provides an integer 463 (e.g., a binary representation of the integer y) to the array storage 456, obtains trits 464 from the array storage 456 and produces an array 466 as an output. In some instances, the integer generator 454 also stores surplus bits 465 in the cache 455. The integer generator 454 may be configured to perform additional or different operations.

In some aspects of operation, the example system 450 produces an array of integers according to the example process shown in FIG. 4B. For instance, after the pseudorandom number generator 453 has been seeded by the seed 460, the integer generator 454 obtains (402) the eight-bit sample 462 from the pseudorandom number generator 453. The integer generator 454 then determines (404) whether the eight-bit sample 462 represents an integer less than a threshold value. The integer generator 454 then converts (406) the integer to trits 464, for example, by sending the integer 463 to the array storage 456 and receiving the trits 464 in response. The integer generator 454 obtains (408) a sixty-four bit sample 461 from the pseudorandom number generator 453, and obtains (410) a first set of integers based on the sixty-four bit sample 461. The integer generator 454 caches (412) surplus bits 465, for example, by sending the surplus bits 465 to the cache 455. The integer generator 454 then generates (414) a second set of integers based on the trits 464 and the first set of integers. The integer generator 454 then produces (416) the array 466 that includes the second set of integers. In some instances, the example system 450 and its components may operate in another manner.

FIG. 5 is a flow diagram showing another example process 500 for generating an array of integers. The example process 500 can be performed, for example, by a computer system that includes a memory and a processor. For instance, operations in the process 500 may be performed by either of the nodes 102, 104 in the example communication system 100 shown in FIG. 1 or in another type of system. In some cases, the example process 500 can be performed or utilized as part of a cryptographic protocol (e.g., by an entity performing a key agreement protocol) or in another type of process.

The example process 500 may include additional or different operations, and the operations may be performed in the order shown or in another order. In some cases, one or more of the operations shown in FIG. 5 are implemented as processes that include multiple operations, sub-processes for other types of routines. In some cases, operations can be combined, performed in another order, performed in parallel, iterated or otherwise repeated or performed in another manner.

In some implementations, the process 500 receives a stream of pseudorandom data as input, and generates an array of non-negative integers as output. The stream of pseudorandom data can be or include, for example, a stream of pseudorandom bits from a pseudorandom number generator or another source. In some implementations, the pseudorandom number generator is seeded, for example, by a seed value, before the process 500 begins, and the process 500 uses pseudorandom data from the seeded pseudorandom number generator to produce an array of "random-looking" integers based on the seed value. The array of integers can be "random-looking," for example, from the perspective of an adversary or another entity. The array can be an array of non-negative integers where each integer in the array belongs to $\{0, \ldots, q-1\}$, or an array of integers in another range less than a modulus value q.

Like the example process 400 shown in FIG. 4A, the example process 500 shown in FIG. 5 makes use of the fact that $12288=3\times2^{12}$. The process 500 shown in FIG. 5 also makes use of the fact that $3^{17}=129140163\approx134217728=2^{27}$, and there is a 3.78% probability that twenty-seven random bits will fail to produce seventeen random trits of data.

At 502, thirty-two pseudorandom bits are obtained; five of the thirty-two pseudorandom bits can be discarded, and the remaining twenty-seven bits can be interpreted as an integer y in $\{0, \ldots, 2^{27}-1\}$. The pseudorandom bits may be obtained from a pseudorandom number generator or another source. For example, the pseudorandom bits may be retrieved by directly retrieving four bytes of pseudorandom data from a pseudorandom number generator, by retrieving cached bits (e.g., from a cache) that were previously retrieved from the pseudorandom number generator, or otherwise.

In the example shown in FIG. 5, thirty-two bits of pseudorandom data are obtained at 502, for instance, when the pseudorandom data are retrieved from a pseudorandom number generator and the pseudorandom number generator provides pseudorandom data in portions no smaller than one byte (8 bits). Because only 27 bits are needed to define the integer y, the five surplus bits can be saved for subsequent iterations of the process 500, for example, by caching the surplus bits. In some cases, the same cache can be used to store surplus pseudorandom bits from multiple operations in the process 500. For instance, surplus bits from 502 can be cached with surplus bits from 508. In some cases, the pseudorandom number generator has another minimum retrieval limit (e.g., more or less than one byte), and the retrieval of pseudorandom data and caching operations in the process 500 can be modified, for example, such that sufficient pseudorandom data are retrieved in each step and any unneeded pseudorandom data are cached for subsequent iterations or executions.

At 504, a determination is made whether the integer represented by the thirty-two pseudorandom bits is less than a threshold value. In the example shown in FIG. 5, the threshold value is $129140136=3^{17}$, which is the highest integer value that can be represented by seventeen trits (seventeen digits in a base-three number system). Thus, if $y \geq 3^{17}$, then the four-byte sample obtained at 502 is rejected. Another threshold value may be used in some cases.

At 506, twenty-seven of the thirty-two pseudorandom bits are converted to seventeen trits $\{t_i\}$; the seventeen trits represent the integer y in a trinary number system. Thus, the twenty-seven pseudorandom bits and the seventeen trits represent the same integer y in base-two and base-three number systems, respectively. In some implementations, converting the pseudorandom bits to trits includes accessing pre-computed values from a storage medium, or converting from base-two notation to base-three notation by a conversion calculation.

At 508, two hundred eight (208) pseudorandom bits are obtained. The pseudorandom bits may be obtained from a pseudorandom number generator or another source. For example, the pseudorandom bits may be retrieved by directly retrieving twenty-six bytes of pseudorandom data from a pseudorandom number generator, by retrieving cached bits (e.g., from a cache) that were previously retrieved from the pseudorandom number generator, or otherwise. In some cases, another number (fewer or more) than two hundred eight (208) pseudorandom bits are obtained at 508. For example, twenty-five bytes (200 bits) of pseudorandom data may be retrieved from a pseudorandom number generator, and four bits of pseudorandom data may be retrieved from a cache.

At 510, a first set of seventeen binary integers $\{b_i\}$ is obtained from the pseudorandom bits obtained at 508. For example, two hundred four (204) of the pseudorandom bits obtained at 508 may be interpreted as seventeen integers. In the example shown in FIG. 5, each of the seventeen binary integers $\{b_i\}$ is a twelve-bit binary number, and the integers can be obtained, for example, by parsing 204 pseudorandom bits into groups of twelve (e.g., to obtain seventeen 12-bit words). In some cases, a portion of the pseudorandom bits obtained at 508 are not used to generate the first set of integers $\{b_i\}$ at 510.

At 512, surplus bits are cached. For example, if one or more of the pseudorandom bits obtained at 508 are not used to generate the first set of integers $\{b_i\}$ at 510, the surplus pseudorandom bits can be stored in a cache for later use. For example, when 208 pseudorandom bits are obtained at 508, four surplus bits can be cached at 512. In some cases, a different number of surplus pseudorandom bits are cached. In some implementations, surplus bits are discarded or handled in another manner.

In some implementations of the process 500, pseudorandom bits are obtained (at 508) for a current iteration of an iterative process, and the surplus bits are cached (at 512) for a subsequent iteration of the iterative process. In the subsequent iteration, the cached pseudorandom bits can be obtained (at 508) from the cache and used to generate integers (at 510) for that iteration.

At 514, a second set of binary integers $\{x_i+1\}$ is generated. The second set of integers is generated based on the trits $\{t_i\}$ (from 506) and the first set of integers $\{b_i\}$ (from 510). In some implementations, each integer in the second set of integers is generated based on a respective one of the trits $\{t_i\}$ and a respective one of the integers in the first set $\{b_i\}$. In the example shown in FIG. 5, each of the integers in the second set is uniquely specified by Equation (2) above. For example, generating the second set of integers may include computing seventeen integers $\{x_i\}$, where $x_i=t_i \times 2^{12}+b_i$, and the second set of integers $\{x_i+1\}$ may be generated from the seventeen computed integers $\{x_i\}$ by adding one to each.

At 516, an array of integers is produced; the array of integers includes at least the second set of integers $\{x_i+1\}$. The array produced by the process 500 shown in FIG. 5 can have the same or similar properties as the array produced by the process 400 shown in FIG. 4A, and the array can be used in the same or a similar manner. For instance, in some cases, each integer in the array produced by the process 500 belongs to $\{1, \ldots, 12288\}$, and the array can be used as the public parameter a in the New Hope proposal.

In some implementations of the process 500, the array of integers is produced by an iterative process that includes multiple iterations of one or more operations shown in FIG. 5. For example, each iteration may include performing each of the operations at 502, 504, 506, 508, 510, 512 and 514 for the iteration, and the array of integers may include the second set of integers $\{x_i+1\}$ generated for multiple iterations of the iterative process.

In some implementations, the array includes 1024 integers, and the array is filled by executing multiple iterations of the process 500. For example, 1020 elements of the array may be obtained by sixty iterations of the process 500, and the remaining four elements to fill the 1024-element array can be obtained by using one iteration of the process 400 shown in FIG. 4 (e.g., discarding the unneeded fifth integer) or by using another technique. In an example implementation, there is an approximately 3.78% probability of rejecting (at 504) the thirty-two pseudorandom bits obtained at 502. Thus, when caching is used, the process 500 can be expected to consume 1749 bytes of pseudorandom data (e.g., over sixty iterations on average), which is only ten bytes above the theoretical minimum.

Accordingly, the example process 300 can be implemented as the example process 400 shown in FIG. 4, as the example process 500 shown in FIG. 5, or any one of a family of modifications to the example processes shown and described—one for each choice of powers of two and three. Other choices of powers of two and three could result in further performance improvement. For some choices of parameters, a performance benefit derived from lower consumption of pseudorandom data may be balanced by a performance penalty incurred in processing large integers. In some instances, hardware resources (e.g., memory size) can influence parameter selection. For example, an array storage for performing the conversion at operation 506 (in the process 500 shown in FIG. 5) may contain 129 million elements. As an alternative, the array storage could contain only a partial set of pre-computed values, providing, for example, only the first 5 or 6 trits and leaving the remaining trits to be computed.

Figure 6:
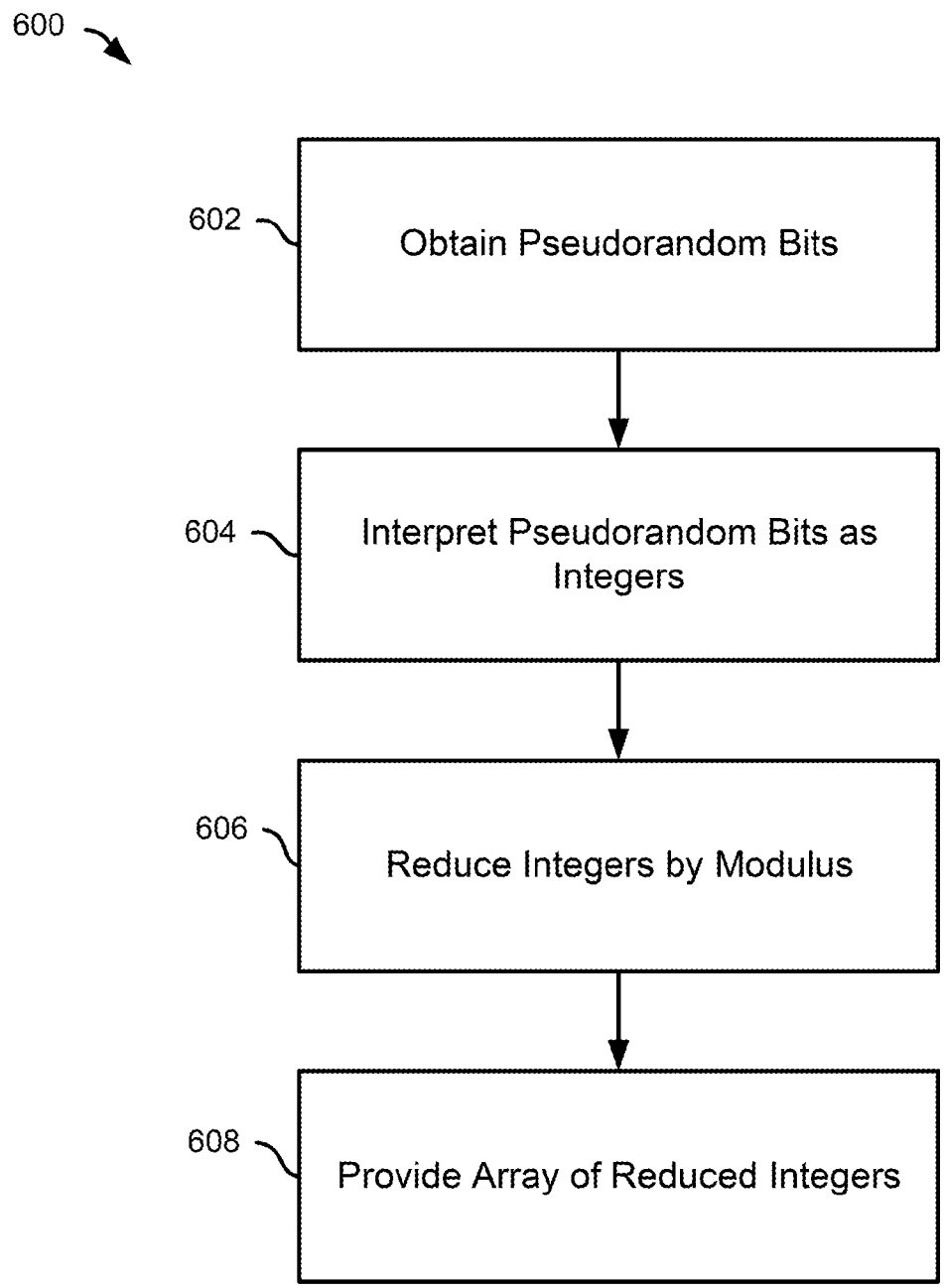
FIG. 6 is a flow diagram showing another example process for generating an array of integers.

FIG. 6 is a flow diagram showing another example process 600 for generating an array of integers. The example process 600 can be performed, for example, by a computer system that includes a memory and a processor. For instance, operations in the process 600 may be performed by either of the nodes 102, 104 in the example communication system 100 shown in FIG. 1 or in another type of system. In some cases, the example process 600 can be performed or utilized as part of a cryptographic protocol (e.g., by an entity performing a key agreement protocol) or in another type of process.

The example process 600 may include additional or different operations, and the operations may be performed in the order shown or in another order. In some cases, one or more of the operations shown in FIG. 6 are implemented as processes that include multiple operations, sub-processes for other types of routines. In some cases, operations can be combined, performed in another order, performed in parallel, iterated or otherwise repeated or performed in another manner.

In some implementations, the process 600 receives a stream of pseudorandom data as input, and generates an array of non-negative integers as output. The stream of pseudorandom data can be or include, for example, a stream of pseudorandom bits from a pseudorandom number generator or another source. In some implementations, the pseudorandom number generator is seeded, for example, by a seed value, before the process 600 begins, and the process 600 uses pseudorandom data from the seeded pseudorandom number generator to produce an array of somewhat "random-looking" integers based on the seed value. The array of integers can be somewhat "random-looking," for example, from the perspective of an adversary or another entity. The array can be an array of non-negative integers where each integer in the array belongs to $\{0, \ldots, q-1\}$, or an array of integers in another range less than a modulus value q.

At 602, pseudorandom bits are obtained. For example, the pseudorandom bits can be obtained from a pseudorandom number generator or another source. At 604, the pseudorandom bits are interpreted as integers. For example, the pseudorandom bits obtained at 602 may be parsed or otherwise processed to define a number equal-sized words, and each of the words can be designated a binary integer. At 606, the integers are reduced by a modulus. For example, each of the integers obtained at 604 may be reduced modulo another integer value (e.g. the modulus 12289 or another modulus). At 608, an array of the reduced integers is provided as an output. In some examples, an array of 1024 integers, each less than the modulus 12289, is provided for use in a key agreement protocol such as, for example, the example key agreement protocol described in the New Hope proposal.

In some implementations of the example process 600, the public parameter a for the New Hope proposal can be generated from 1792 bytes of pseudorandom data. For example, 1792 bytes of pseudorandom data may be obtained at 602, and the 1792 bytes of pseudorandom data may be interpreted as a 1024-element array a' of 14-bit integers. The public parameter a can be produced, for example, by reducing each element of the array a' by the modulus 12289 and returning the array containing the reduced elements. In this example, the array a produced at 608 is not uniformly random because elements from $\{0, \ldots, 4095\}$ appear with probability $2^{-13}$, whereas elements from $\{4096, \ldots, 12288\}$ appear with probability $2^{-14}$. It can be shown that this deviation from uniformity does not significantly compromise security of the key agreement protocol described in the New Hope proposal.

In some implementations of the example process 600, the public parameter a for the New Hope proposal can be generated from two kilobytes of pseudorandom data. For example, 2048 bytes of pseudorandom data may be obtained at 602, and the 2048 bytes of pseudorandom data may be interpreted as a 1024-element array a' of 16-bit integers. The public parameter a can be produced, for example, by reducing each element of the array a' by the modulus 12289 and returning the array containing the reduced elements. In this example, the array a produced at 608 is not uniformly random because elements from $\{0, \ldots, 4091\}$ appear with probability $1.5 \times 2^{-14}$, whereas elements from $\{4092, \ldots, 12288\}$ appear with probability $1.25 \times 2^{-14}$. It can also be shown here that this deviation from uniformity does not significantly compromise security of the key agreement protocol described in the New Hope proposal. The distribution obtained in this example is closer to uniformity than in the example where 1792 bytes of pseudorandom data are used. In addition, the elements in the array a produced in this example are represented in a standard 16-bit computer word size, which may enable faster parsing of the pseudorandom data.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, integers for a cryptographic protocol are generated.

In a first example, a lattice-based cryptography method includes obtaining a first plurality of digits. The first plurality of digits represent an integer in a first number system. The first plurality of digits are converted to a second plurality of digits. The second plurality of digits represent the integer in a second number system. A plurality of integers in the first number system are generated based on the second plurality of digits. An array that includes the plurality of integers is produced. Each integer is less than a modulus. The array of integers is used in a lattice-based cryptographic protocol.

Implementations of the first example may include one or more of the following features. An array of integers is produced by an iterative process that includes multiple iterations. The $i^{th}$ iteration of the iterative process can include: obtaining a first plurality of digits for the $i^{th}$ iteration, the first plurality of digits representing an integer in the first number system; converting the first plurality of digits to a second plurality of digits for the $i^{th}$ iteration, the second plurality of digits representing the integer in the second number system; and generating a plurality of integers in the first number system for the $i^{th}$ iteration based on the second plurality of digits for the $i^{th}$ iteration; wherein the array of integers includes the plurality of integers generated for multiple iterations of the iterative process. The plurality of integers in the first number system can be a second plurality of integers for the $i^{th}$ iteration, and the $i^{th}$ iteration can include: obtaining a first plurality of integers for the $i^{th}$ iteration; and generating the second plurality of integers based on the second plurality of digits and the first plurality of integers for the $i^{th}$ iteration. Obtaining the first plurality of integers for the $i^{th}$ iteration can include: obtaining, from a pseudorandom number generator, pseudorandom digits for the $i^{th}$ iteration; designating the first plurality of integers for the $i^{th}$ iteration from a first subset of the pseudorandom digits; and caching a second subset of the pseudorandom digits for a subsequent iteration (e.g., for the $(i+1)^{th}$ iteration) of the iterative process. Obtaining the first plurality of integers for the $i^{th}$ iteration can include: obtaining pseudorandom digits for the $i^{th}$ iteration, a first subset of the pseudorandom digits being obtained from a pseudorandom number generator, a second subset of the pseudorandom digits being obtained from a cache; and designating the first plurality of integers for the $i^{th}$ iteration from at least a subset of the pseudorandom digits for the iteration $i^{th}$.

Implementations of the first example may include one or more of the following features. The array of integers can be used in a lattice-based key agreement protocol, a lattice-based signature protocol or another cryptographic protocol. The array may contain 1024 or another number of integers less than the modulus 12289 or another modulus. The array may contain non-negative integers or positive integers less than the modulus. Obtaining the first plurality of digits can include: obtaining a set of pseudorandom digits; and designating the set of pseudorandom digits as the first plurality of digits in response to a determination that the set of pseudorandom digits represents an integer in the first number system that is less than a threshold value. Converting the first plurality of digits to the second plurality of digits can include accessing pre-computed values of the second plurality of digits from a storage medium.

Implementations of the first example may include one or more of the following features. The plurality of integers in the first number system can be a second plurality of integers. A first plurality of integers in the first number system can be obtained, and the second plurality of integers can be generated based on the second plurality of digits and the first plurality of integers. Each integer in the second set can be generated based on a respective one of the second plurality of digits and a respective one of the integers in the first set. Each integer in the second set can be generated based on adding the respective integer in the first set to a product of the respective digit in the second plurality multiplied by a common value. Obtaining a first plurality of digits can include obtaining bits that represent the integer in a base-two number system, and the second plurality of digits can represent the integer in a base-three number system. Obtaining the first plurality of digits can include obtaining eight pseudorandom bits that represent the integer in a base-two number system. Obtaining the first plurality of integers can include obtaining a first set of five integers by: obtaining sixty pseudorandom bits; and obtaining the first set of five integers from the sixty pseudorandom bits. Each of the five integers in the first set can include a respective set of twelve bits from the sixty pseudorandom bits. Obtaining sixty pseudorandom bits can include retrieving a first portion of the sixty pseudorandom bits from a cache and retrieving a second portion of the sixty pseudorandom bits from a pseudorandom number generator. Converting the first plurality of digits to a second plurality of digits can include converting the eight pseudorandom bits to five trits $\{t_i\}$. Generating the second plurality of integers includes generating the second set of five integers $\{x_i\}$ based on computing $x_i = t_i \times 2^{12} + b_i$, where $\{b_i\}$ represents the first set of five integers. The second set of five integers can include a set of non-negative values $\{x_i+1\}$ less than the modulus 12289.

In a second example, a cryptography method includes obtaining bits that represent an integer in a binary (base-two) number system. The bits are converted to trits that represent the integer in a trinary (base-three) number system. The trits are used to generate a plurality of integers in the binary number system, and each of the plurality of integers is based on a respective one of the trits. An array of integers, each less than a modulus, is produced. The array of integers includes the plurality of integers. The array of integers is used in a cryptographic protocol.

Implementations of the second example may include one or more of the following features. The array of integers can be used in a lattice-based key agreement protocol. The array of integers can be used in a lattice-based signature protocol. The array of integers is produced by an iterative process that includes multiple iterations. The $i^{th}$ iteration can include: obtaining bits for the $i^{th}$ iteration, the bits representing an integer in the binary number system; converting the bits to trits for the $i^{th}$ iteration, the trits representing the integer in a second number system; and using the trits for the $i^{th}$ iteration to generate a plurality of integers in the binary number system for the $i^{th}$ iteration. The array of integers can include the plurality of integers generated for multiple iterations of the iterative process. The plurality of integers in the binary number system can include a second plurality of integers, and the $i^{th}$ iteration can include: obtaining a first plurality of integers for the $i^{th}$ iteration; and generating the second plurality of integers based on the trits and the first plurality of integers for the $i^{th}$ iteration. Obtaining the first plurality of integers for the $i^{th}$ iteration can include: obtaining, from a pseudorandom number generator, pseudorandom bits for the $i^{th}$ iteration; designating the first plurality of integers for the $i^{th}$ iteration from a first subset of the pseudorandom bits; and caching a second subset of the pseudorandom bits for a subsequent iteration of the iterative process. Obtaining the first plurality of integers for the $i^{th}$ iteration can include obtaining pseudorandom bits for the $i^{th}$ iteration. A first subset of the pseudorandom bits can be retrieved from a pseudorandom number generator, and a second subset of the pseudorandom bits can be retrieved from a cache. Obtaining the first plurality of integers for the $i^{th}$ iteration can include designating the first plurality of integers for the $i^{th}$ iteration from at least a subset of the pseudorandom bits for the $i^{th}$ iteration.

Implementations of the second example may include one or more of the following features. Converting the bits to trits can include accessing pre-computed values of the trits from a storage medium. The plurality of integers in the binary number system can be a second plurality of integers, and the second plurality of integers can be generated based on the trits and a first plurality of integers in the binary number system. Each integer in the second set can be generated based on a respective one of the trits and a respective one of the integers in the first set. Obtaining the bits can include obtaining eight pseudorandom bits. Converting the bits to trits can include converting the eight pseudorandom bits to five trits $\{t_i\}$. Obtaining the first plurality of integers can include obtaining a first set of five integers by: obtaining sixty pseudorandom bits; and obtaining the first set of five integers from the sixty pseudorandom bits. Each of the five integers in the first set can include a respective set of twelve bits from the sixty pseudorandom bits. Generating the second plurality of integers can include generating a second set of five integers $\{x_i\}$ based on computing $x_i = t_i \times 2^{12} + b_i$, where $\{b_i\}$ represents the first set of five integers.

In a third example, a computing system includes a data processing apparatus and a computer-readable medium storing instructions that are operable when executed by the data processing apparatus to perform operations. The operations include: obtaining a first plurality of digits from a pseudorandom number generator, the first plurality of digits representing an integer in a first number system; converting the first plurality of digits to a second plurality of digits, the second plurality of digits representing the integer in a second number system; generating a plurality of integers in the first number system based on the second plurality of digits; and producing an array of integers each less than a modulus, the array of integers comprising the plurality of integers.

Implementations of the third example may include one or more of the following features. The array of integers can be used in a lattice-based key agreement protocol, a lattice-based signature protocol or another cryptographic protocol. The plurality of integers can be a second plurality of integers, and the operations can include: obtaining a first plurality of integers in the first number system based on a third plurality of digits retrieved from the pseudorandom number generator; and generating the second plurality of integers based on the first plurality of integers and the second set of digits. The third plurality of digits can include surplus digits not used in the first plurality of integers. The computing system can include a cache configured to store the surplus digits for later use. The computing system can include an array storage that stores pre-computed values for the second number system. Converting the first plurality of digits to the second plurality of digits can include accessing pre-computed values of the second plurality of digits from the array storage.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A lattice-based cryptography method comprising:
    obtaining a first plurality of digits based on pseudorandom data from a pseudorandom number generator, the first plurality of digits representing an integer in a first number system;
    determining whether to reject the pseudorandom data based on comparing the integer with a second threshold that is based on a second number system, wherein comparing the integer with the second threshold reduces a probability of rejecting the pseudorandom data relative to comparing the integer with a first threshold that is based on the first number system;
    in response to determining not to reject the pseudorandom data, converting the first plurality of digits to a second plurality of digits, the second plurality of digits representing the integer in the second number system;
    by operation of a processor, generating a plurality of integers in the first number system based on the second plurality of digits;
    producing an array of integers each less than a modulus, the array of integers comprising the plurality of integers; and
    using the array of integers in a lattice-based cryptography protocol executed by computer nodes configured to exchange information over a communication channel.

2. The lattice-based cryptography method of claim 1, wherein the plurality of integers comprises a second plurality of integers, and the method comprises:
    after seeding the pseudorandom number generator, obtaining the first plurality of digits and a first plurality of integers based on the pseudorandom data from the pseudorandom number generator; and
    generating the second plurality of integers based on the second plurality of digits and the first plurality of integers.

3. The lattice-based cryptography method of claim 1, comprising producing an array of integers by an iterative process that includes multiple iterations, wherein each iteration includes:

obtaining a first plurality of digits for the iteration, the first plurality of digits for the iteration representing an integer in the first number system;

converting the first plurality of digits for the iteration to a second plurality of digits for the iteration, the second plurality of digits for the iteration representing the integer in the second number system; and generating a plurality of integers in the first number system for the iteration based on the second plurality of digits for the iteration;

wherein the array of integers includes the plurality of integers for multiple iterations of the iterative process.

4. The lattice-based cryptography method of claim 3, wherein the plurality of integers in the first number system comprises a second plurality of integers, and each iteration includes:

obtaining a first plurality of integers for the iteration; and generating the second plurality of integers for the iteration based on the second plurality of digits for the iteration and the first plurality of integers for the iteration.

5. The lattice-based cryptography method of claim 4, wherein obtaining the first plurality of integers for the iteration comprises:

retrieving, from the pseudorandom number generator, pseudorandom digits for the iteration;

obtaining the first plurality of integers for the iteration from a first subset of the pseudorandom digits; and caching a second subset of the pseudorandom digits for a subsequent iteration of the iterative process.

6. The lattice-based cryptography method of claim 4, wherein obtaining the first plurality of integers for the iteration comprises:

obtaining pseudorandom digits for the iteration, a first subset of the pseudorandom digits being retrieved from the pseudorandom number generator, a second subset of the pseudorandom digits being retrieved from a cache; and obtaining the first plurality of integers for the iteration from at least a subset of the pseudorandom digits for the iteration.

7. The lattice-based cryptography method of claim 1, wherein obtaining the first plurality of digits comprises obtaining the pseudorandom data from the pseudorandom number generator.

8. The lattice-based cryptography method of claim 1, wherein converting the first plurality of digits to the second plurality of digits comprises accessing pre-computed values of the second plurality of digits from a storage medium.

9. The lattice-based cryptography method of claim 1, wherein the plurality of integers in the first number system comprises a second plurality of integers, and the method comprises:

obtaining a first plurality of integers in the first number system; and generating the second plurality of integers based on the second plurality of digits and the first plurality of integers.

10. The lattice-based cryptography method of claim 9, wherein each integer in the second plurality of integers is generated based on a respective one of the second plurality of digits and a respective one of the first plurality of integers.

11. The lattice-based cryptography method of claim 10, wherein each integer in the second plurality of integers is generated based on adding the respective integer in the first plurality of integers to a product of the respective digit in the second plurality of digits multiplied by a common value.

12. The lattice-based cryptography method of claim 9, wherein obtaining the first plurality of digits comprises obtaining bits that represent the integer in a base-two number system, and the second plurality of digits represent the integer in a base-three number system.

13. The lattice-based cryptography method of claim 12, wherein:

obtaining the first plurality of digits comprises obtaining eight pseudorandom bits that represent the integer in a base-two number system; and obtaining the first plurality of integers comprises obtaining a first set of five integers by:

obtaining sixty pseudorandom bits; and obtaining the first set of five integers from the sixty pseudorandom bits, each of the five integers in the first set comprising a respective set of twelve bits from the sixty pseudorandom bits.

14. The lattice-based cryptography method of claim 13, wherein:

converting the first plurality of digits to a second plurality of digits comprises converting the eight pseudorandom bits to five trits $\{t_i\}$; and generating the second plurality of integers comprises generating a second set of five integers $\{x_i\}$ based on computing $x_i = t_i \times 2^{12} + b_i$, where $\{b_i\}$ represents the first set of five integers.

15. The lattice-based cryptography method of claim 14, wherein the second set of five integers comprises a set of non-negative values $\{x_i+1\}$ less than a modulus 12289.

16. A cryptography method comprising:

obtaining pseudorandom data from a pseudorandom number generator, the pseudorandom data comprising bits that represent an integer in a binary number system;

determining whether to reject the pseudorandom data based on comparing the integer with a second threshold that is based on a trinary number system, wherein comparing the integer with the second threshold reduces a probability of rejecting the pseudorandom data relative to comparing the integer with a first threshold that is based on the binary number system;

in response to determining not to reject the pseudorandom data, converting the bits to trits that represent the integer in the trinary number system;

by operation of a processor, using the trits to generate a plurality of integers in the binary number system, wherein each of the plurality of integers is based on a respective one of the trits;

producing an array of integers each less than a modulus, the array of integers comprising the plurality of integers; and using the array of integers in a cryptographic protocol executed by computer nodes configured to exchange information over a communication channel.

17. The cryptography method of claim 16, wherein the plurality of integers comprises a second plurality of integers, and the method comprises:

after seeding the pseudorandom number generator, obtaining the bits and a first plurality of integers based on the pseudorandom data from the pseudorandom number generator; and generating the second plurality of integers based on the trits and the first plurality of integers.

18. The cryptography method of claim 16, comprising using the array of integers in a lattice-based key agreement protocol.

19. The cryptography method of claim 16, comprising using the array of integers in a lattice-based signature protocol.

20. The cryptography method of claim 16, comprising producing an array of integers by an iterative process that includes multiple iterations, wherein each iteration includes:
  obtaining bits for the iteration, the bits representing an integer in the binary number system;
  converting the bits to trits for the iteration, the trits representing the integer in a second number system; and
  using the trits for the iteration to generate a plurality of integers in the binary number system for the iteration;
  wherein the array of integers includes the plurality of integers for multiple iterations of the iterative process.

21. The cryptography method of claim 20, wherein the plurality of integers in the binary number system comprises a second plurality of integers, and each iteration includes:
  obtaining a first plurality of integers for the iteration; and
  generating the second plurality of integers based on the trits and the first plurality of integers.

22. The cryptography method of claim 21, wherein obtaining the first plurality of integers for the iteration comprises:
  obtaining, from the pseudorandom number generator, pseudorandom bits for the iteration;
  designating the first plurality of integers for the iteration from a first subset of the pseudorandom bits; and
  caching a second subset of the pseudorandom bits for a subsequent iteration of the iterative process.

23. The cryptography method of claim 21, wherein obtaining the first plurality of integers for the iteration comprises:
  obtaining pseudorandom bits for the iteration, a first subset of the pseudorandom bits being retrieved from the pseudorandom number generator, a second subset of the pseudorandom bits being retrieved from a cache; and
  designating the first plurality of integers for the iteration from at least a subset of the pseudorandom bits for the iteration.

24. The cryptography method of claim 16, wherein converting the bits to trits comprises accessing pre-computed values of the trits from a storage medium.

25. The cryptography method of claim 16, wherein the plurality of integers in the binary number system comprises a second plurality of integers, and the method comprises:
  obtaining a first plurality of integers in the binary number system; and
  generating the second plurality of integers based on the trits and the first plurality of integers.

26. The cryptography method of claim 25, wherein:
  obtaining the bits comprises obtaining eight pseudorandom bits;
  converting the bits to trits comprises converting the eight pseudorandom bits to five trits $\{t_i\}$;
  obtaining the first plurality of integers comprises obtaining a first set of five integers by:
    obtaining the first set of five integers from sixty pseudorandom bits, each of the five integers in the first set comprising a respective set of twelve bits from the sixty pseudorandom bits; and
  generating the second plurality of integers comprises generating a second set of five integers $\{x_i\}$ based on computing $x_i = t_i \times 2^{12} + b_i$, where $\{b_i\}$ represents the first set of five integers.

27. A computing system comprising:
  a data processing apparatus;
  a computer-readable medium storing instructions that are operable when executed by the data processing apparatus to perform operations comprising:
    obtaining a first plurality of digits based on pseudorandom data from a pseudorandom number generator, the first plurality of digits representing an integer in a first number system;
    determining whether to reject the pseudorandom data based on comparing the integer with a second threshold that is based on a second number system, wherein comparing the integer with the second threshold reduces a probability of rejecting the pseudorandom data relative to comparing the integer with a first threshold that is based on the first number system;
    in response to determining not to reject the pseudorandom data, converting the first plurality of digits to a second plurality of digits, the second plurality of digits representing the integer in a second number system;
    generating a plurality of integers in the first number system based on the second plurality of digits;
    producing an array of integers each less than a modulus, the array of integers comprising the plurality of integers; and
    using the array of integers in a lattice-based cryptography protocol executed by computer nodes configured to exchange information over a communication channel.

28. The computing system of claim 27, wherein the plurality of integers comprises a second plurality of integers, and the operations comprise:
  obtaining a first plurality of integers in the first number system based on a third plurality of digits from the pseudorandom number generator; and
  generating the second plurality of integers based on the first plurality of integers and the second plurality of digits.

29. The computing system of claim 28, wherein the third plurality of digits includes one or more surplus digits not used in the first plurality of integers, and the computing system further comprises a cache configured to store the one or more surplus digits.

30. The computing system of claim 27, further comprising an array storage that stores pre-computed values for the second number system, and converting the first plurality of digits to the second plurality of digits comprises accessing pre-computed values of the second plurality of digits from the array storage.

* * * * *